US011648754B2

(12) United States Patent
Nishino et al.

(10) Patent No.: US 11,648,754 B2
(45) Date of Patent: May 16, 2023

(54) INTERLAYER FOR LAMINATED GLASS, AND LAMINATED GLASS

(71) Applicant: SEKISUI CHEMICAL CO., LTD., Osaka (JP)

(72) Inventors: Hiromitsu Nishino, Kouka (JP); Etsurou Hirota, Kouka (JP); Koji Kumakura, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/762,466

(22) PCT Filed: Sep. 29, 2016

(86) PCT No.: PCT/JP2016/078907
§ 371 (c)(1),
(2) Date: Mar. 22, 2018

(87) PCT Pub. No.: WO2017/057625
PCT Pub. Date: Apr. 6, 2017

(65) Prior Publication Data
US 2018/0272661 A1    Sep. 27, 2018

(30) Foreign Application Priority Data
Sep. 30, 2015    (JP) .............................. JP2015-195405

(51) Int. Cl.
*B32B 17/10*    (2006.01)
*B60J 1/02*    (2006.01)
(Continued)

(52) U.S. Cl.
CPC ...... *B32B 17/10568* (2013.01); *B29C 48/002* (2019.02); *B29C 48/08* (2019.02);
(Continued)

(58) Field of Classification Search
CPC ........... B32B 3/26; B32B 3/263; B32B 5/142; B32B 7/02; B32B 7/12; B32B 17/06;
(Continued)

(56) References Cited

U.S. PATENT DOCUMENTS 5,425,977 A     6/1995  Hopfe
5,455,103 A  *  10/1995  Hoagland ......... B32B 17/10577
                                                428/167
(Continued)

FOREIGN PATENT DOCUMENTS

BR    11 2018 006128 0 A2    10/2018
CN         101119843 A         2/2008
(Continued)

OTHER PUBLICATIONS

International Search Report for the Application No. PCT/JP2016/078907 dated Dec. 13, 2016.
(Continued)

*Primary Examiner* — Catherine A. Simone
(74) *Attorney, Agent, or Firm* — Cheng Law Group, PLLC

(57) ABSTRACT

An interlayer film for laminated glass is disclosed which contains a thermoplastic resin and has a portion where the amount of increase in the thickness is increased in a direction from one end to the other end in the region where the thickness is increased, or has a portion where the amount of increase in the thickness is decreased in a direction from one end to the other end in the region where the thickness is increased, and the ten-point average roughness Rz of the surface at a center position of the portion where the amount of increase in the thickness is increased, or the portion where the amount of increase in the thickness is decreased is 20 µm or more.

14 Claims, 4 Drawing Sheets

(51) Int. Cl.
*B32B 3/26* (2006.01)
*B60J 3/00* (2006.01)
*B29C 48/00* (2019.01)
*B29C 48/08* (2019.01)
*B29C 48/13* (2019.01)
*B29C 48/21* (2019.01)
*B60K 35/00* (2006.01)
*B29K 31/00* (2006.01)
*B29L 31/30* (2006.01)
*B29L 31/00* (2006.01)

(52) U.S. Cl.
CPC .............. *B29C 48/13* (2019.02); *B29C 48/21* (2019.02); *B32B 3/263* (2013.01); *B32B 17/10018* (2013.01); *B32B 17/10036* (2013.01); *B32B 17/10541* (2013.01); *B32B 17/10577* (2013.01); *B32B 17/10587* (2013.01); *B32B 17/10596* (2013.01); *B32B 17/10761* (2013.01); *B60J 1/02* (2013.01); *B60J 3/007* (2013.01); *B60K 35/00* (2013.01); *B29K 2031/04* (2013.01); *B29L 2031/30* (2013.01); *B29L 2031/778* (2013.01); *B32B 2367/00* (2013.01); *B32B 2605/006* (2013.01); *B60K 2370/347* (2019.05)

(58) Field of Classification Search
CPC . B32B 17/064; B32B 17/10; B32B 17/10293; B32B 17/10339; B32B 17/10431; B32B 17/1055; B32B 17/10559; B32B 17/10614; B32B 17/10633; B32B 17/10651; B32B 17/1066; B32B 27/06; B32B 27/08; B32B 27/18; B32B 2250/05; B32B 2307/71; B32B 2551/00; B32B 2605/006; Y10T 428/24479; Y10T 428/24504; Y10T 428/24612; Y10T 428/24802; Y10T 428/24851; Y10T 428/24926; Y10T 428/24942; Y10T 428/2495; Y10T 428/24959
USPC ........ 428/114, 156, 157, 159–164, 168, 172, 428/195.1, 204, 206, 207, 210, 212, 213, 428/214
See application file for complete search history.

(56) References Cited

U.S. PATENT DOCUMENTS

| | | | |
|---|---|---|---|
| 6,077,374 A | 6/2000 | Hopfe | |
| 6,414,796 B1 | 7/2002 | Muromachi et al. | |
| 6,680,350 B1* | 1/2004 | Dobler | C08K 5/3417 524/88 |
| 2002/0008926 A1 | 1/2002 | Freeman | |
| 2004/0053006 A1 | 3/2004 | Omizu et al. | |
| 2004/0166288 A1 | 8/2004 | Travis et al. | |
| 2006/0188695 A1 | 8/2006 | Yacovone | |
| 2006/0210776 A1 | 9/2006 | Lu et al. | |
| 2007/0009714 A1 | 1/2007 | Lee et al. | |
| 2007/0269639 A1 | 11/2007 | Travis et al. | |
| 2008/0075923 A1 | 3/2008 | Travis et al. | |
| 2010/0314900 A1 | 12/2010 | Labrot et al. | |
| 2013/0149503 A1 | 6/2013 | Yamamoto et al. | |
| 2013/0273318 A1 | 10/2013 | Yacovone | |
| 2014/0000789 A1 | 1/2014 | Yacovone | |
| 2014/0224423 A1 | 8/2014 | Keller | |
| 2015/0298447 A1 | 10/2015 | Yacovone | |
| 2016/0151996 A1 | 6/2016 | Kitano et al. | |
| 2016/0159041 A1* | 6/2016 | Lu | B32B 17/10568 428/162 |
| 2017/0015082 A1 | 1/2017 | Creytens et al. | |
| 2018/0297332 A1 | 10/2018 | Nishino et al. | |

FOREIGN PATENT DOCUMENTS

| | | |
|---|---|---|
| CN | 101888927 A | 11/2010 |
| CN | 103080037 A | 5/2013 |
| JP | 4-502525 A | 5/1992 |
| JP | 2001-19499 A | 1/2001 |
| JP | 2005-68006 A | 3/2005 |
| JP | 2008-544878 A | 12/2008 |
| JP | 2010-24138 A | 2/2010 |
| JP | 2012-224500 A | 11/2012 |
| JP | 2013-6731 A | 1/2013 |
| JP | 2014-156390 A | 8/2014 |
| JP | 2015-116679 A | 6/2015 |
| JP | 2015-116680 A | 6/2015 |
| JP | 2015-116682 A | 6/2015 |
| TW | 262433 B | 11/1995 |
| WO | WO-91/06031 A1 | 5/1991 |
| WO | WO-99/63389 A1 | 12/1999 |
| WO | WO-01/72509 A2 | 10/2001 |
| WO | WO-2015/016365 A1 | 2/2015 |
| WO | WO-2017/011435 A1 | 1/2017 |

OTHER PUBLICATIONS

Written Opinion of the International Searching Authority (PCT/ISA/237) for the Application No. PCT/JP2016/078907 dated Dec. 13, 2016 (English Translation mailed Apr. 12, 2018).

Supplementary European Search Report for the Application No. EP 16 851 796.9 dated Apr. 30, 2019.

Taiwanese Office Action for Application No. 105131526 dated Nov. 29, 2019.

European Office Action for the Application No. 16 851 796.9 dated Jul. 21, 2022.

The First Office Action for the Application No. 202110632950.6 from The State Intellectual Property Office of the People's Republic of China dated Aug. 12, 2022.

Brazilian Office Action for the Application No. 112018006158-1 dated Nov. 16, 2022.

* cited by examiner

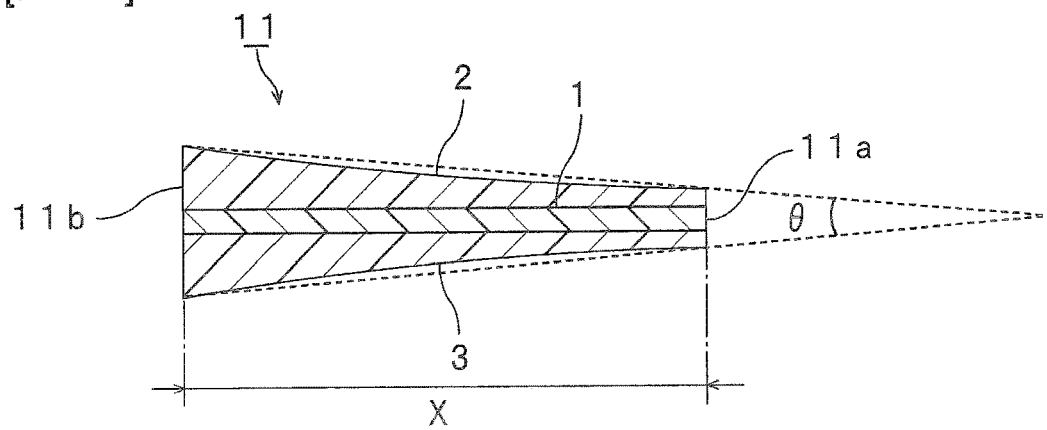
[FIG. 1]
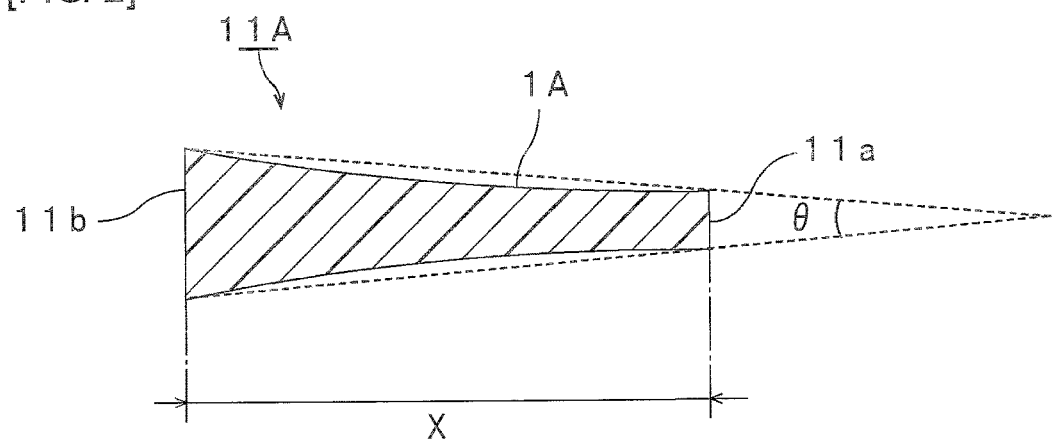
[FIG. 2]
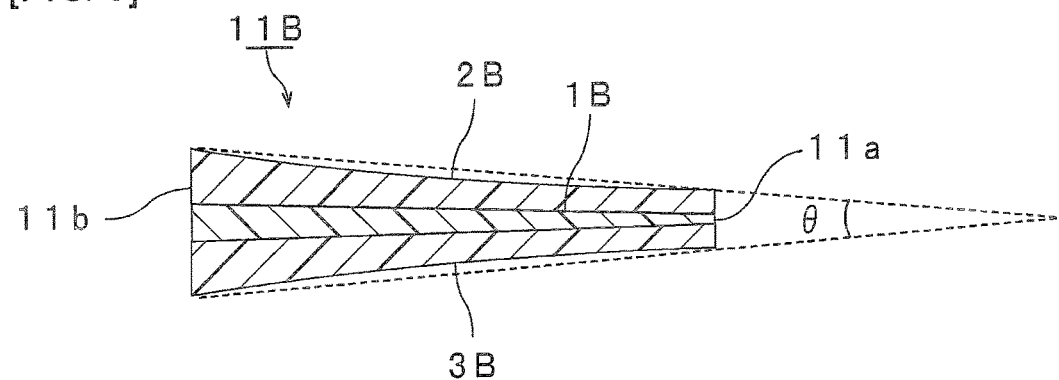
[FIG. 3]
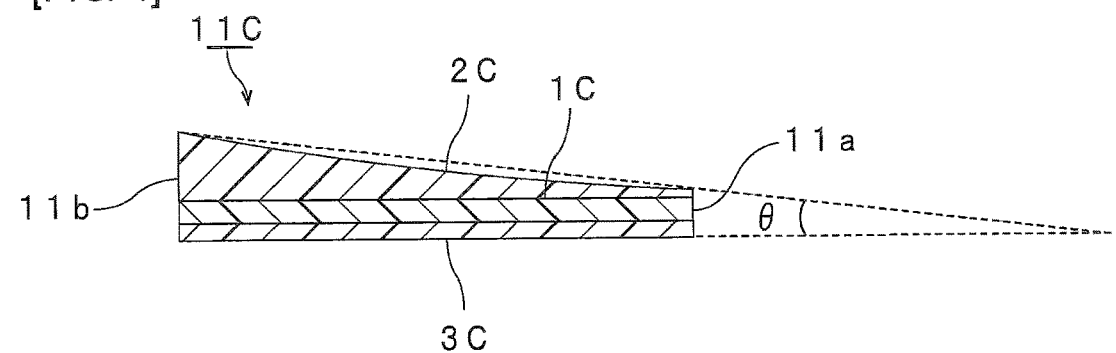
[FIG. 4]

[FIG. 5]
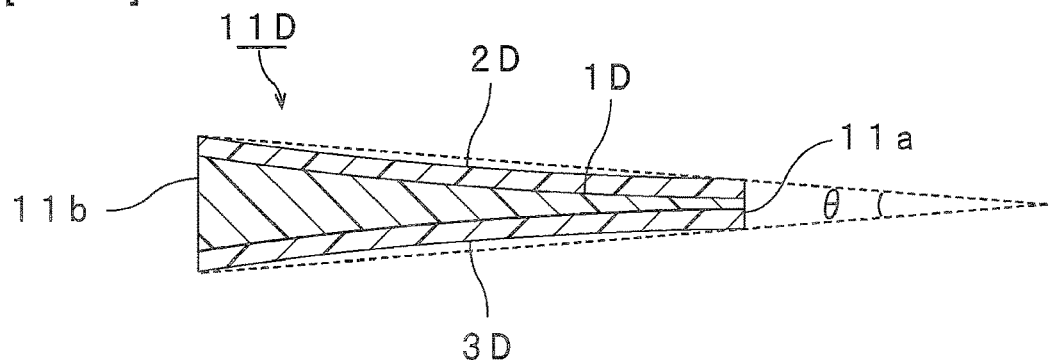
[FIG. 6]
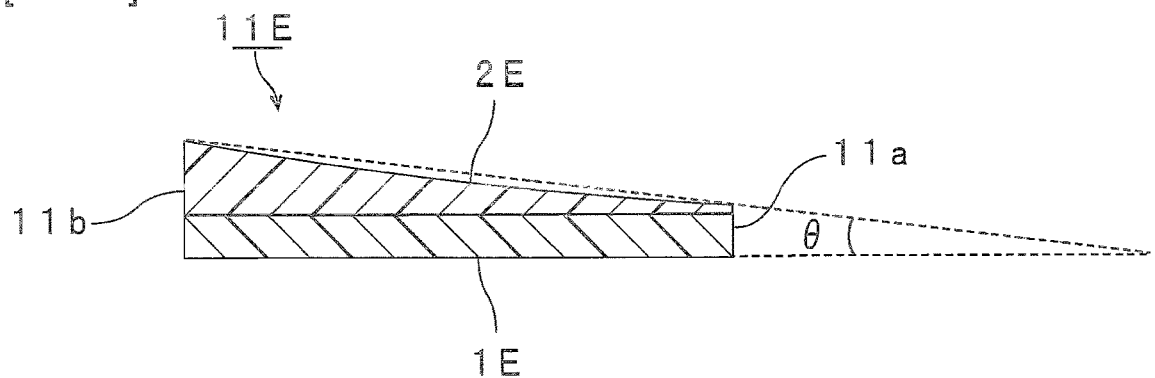
[FIG. 7]
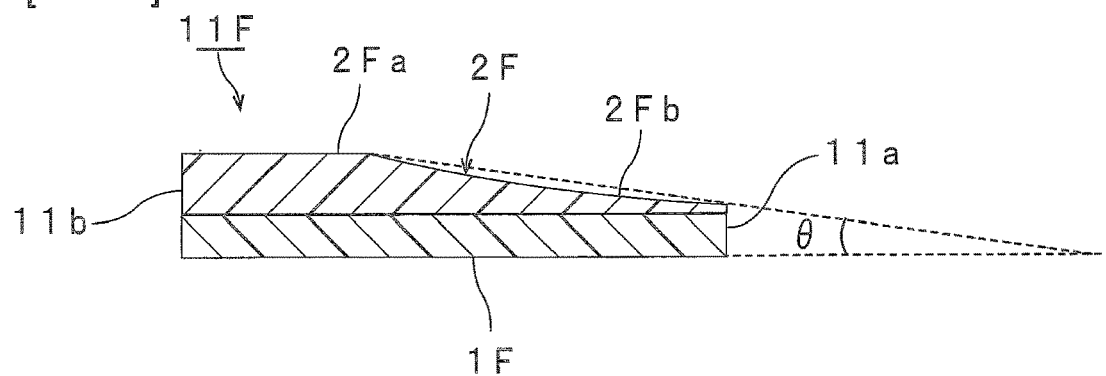
[FIG. 8]
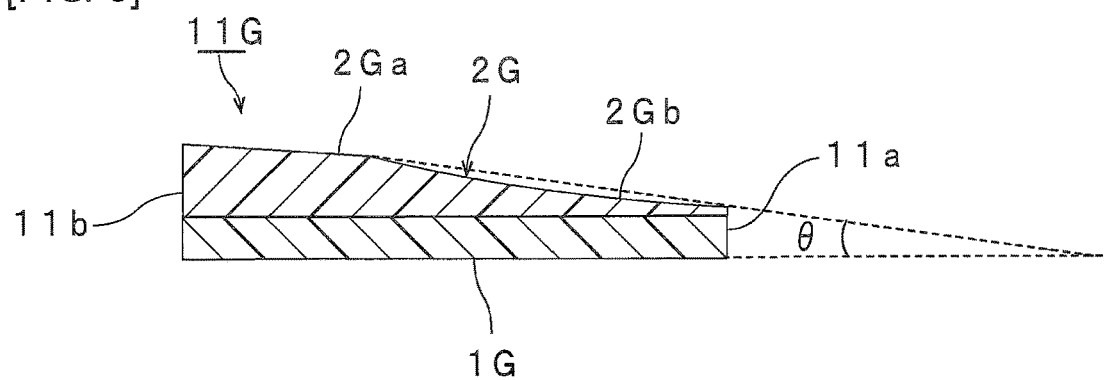

[FIG. 9]
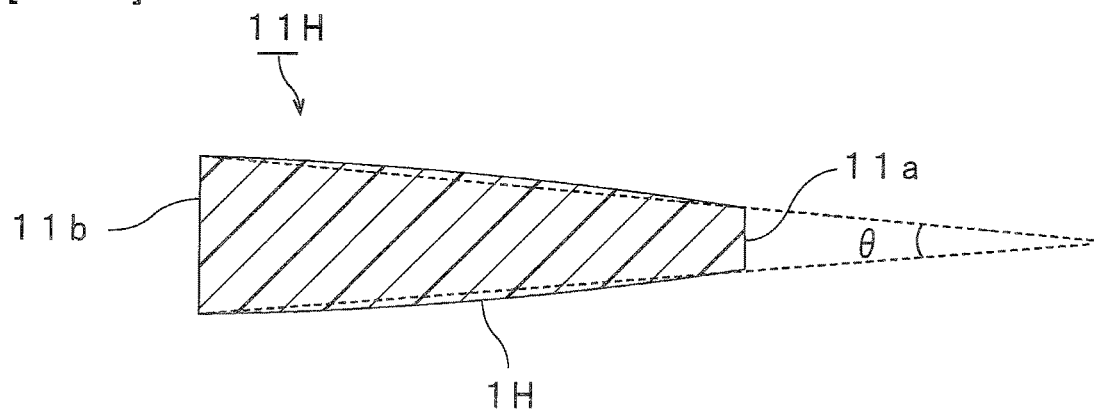
[FIG. 10]
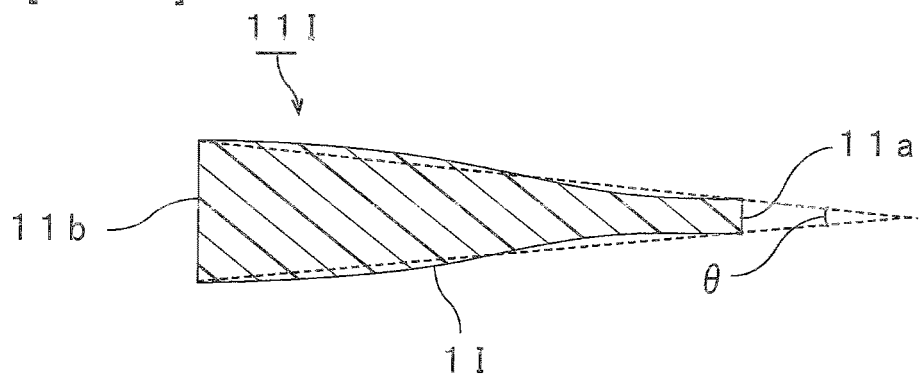
[FIG. 11]
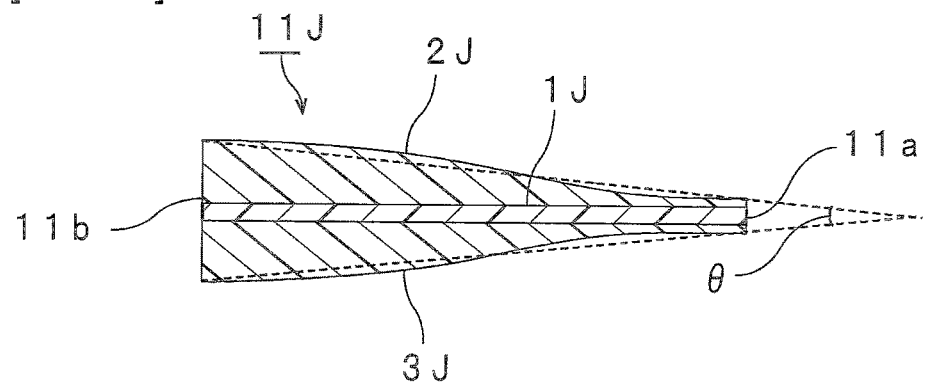
[FIG. 12]
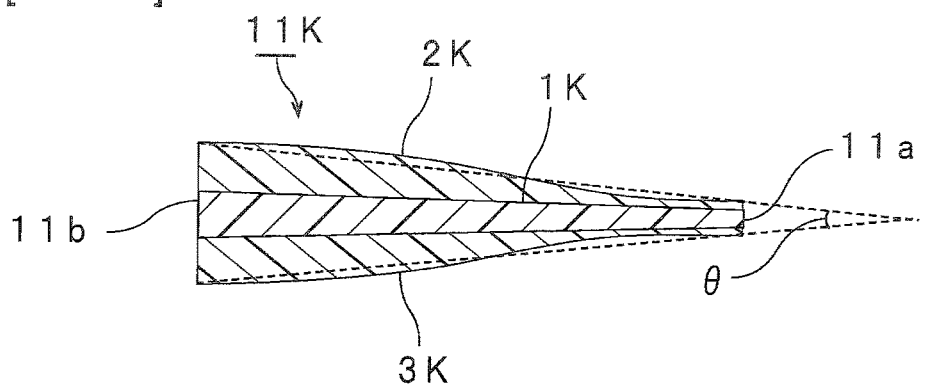

[FIG. 13]
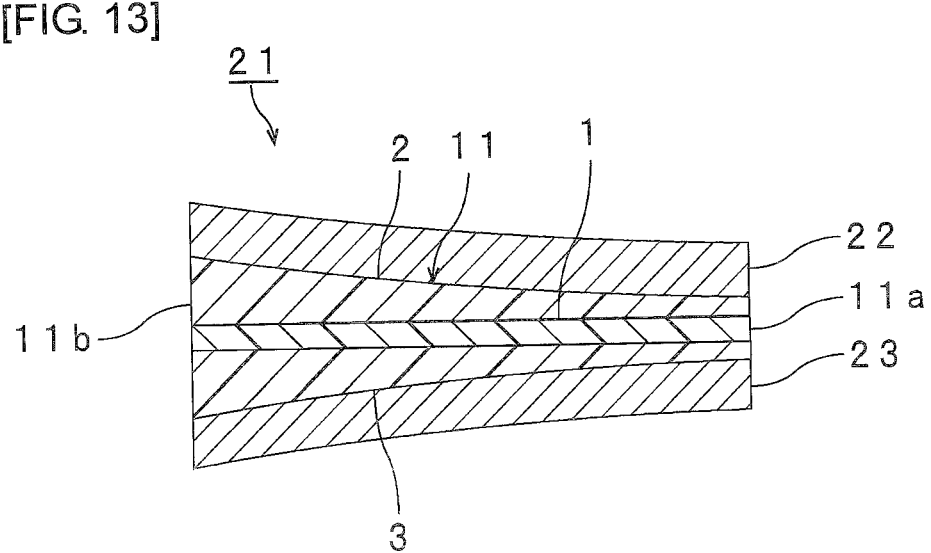
[FIG. 14]
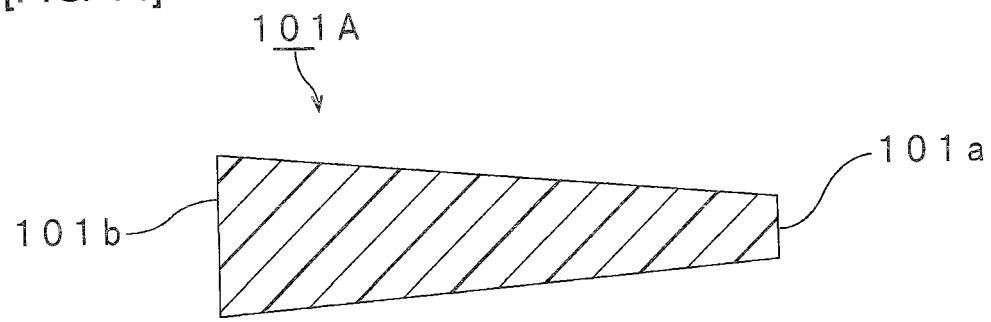

INTERLAYER FOR LAMINATED GLASS, AND LAMINATED GLASS

TECHNICAL FIELD

The present invention relates to an interlayer film for laminated glass which is used for obtaining laminated glass. Moreover, the present invention relates to laminated glass prepared with the interlayer film for laminated glass.

BACKGROUND ART

Since laminated glass generally generates only a small amount of scattering glass fragments even when subjected to external impact and broken, laminated glass is excellent in safety. As such, the laminated glass is widely used for automobiles, railway vehicles, aircraft, ships, buildings, and the like. The laminated glass is produced by sandwiching an interlayer film for laminated glass between a pair of glass plates.

Moreover, as the laminated glass used for automobiles, a head-up display (HUD) has been known. In the HUD, on the windshield of an automobile, measured information such as the speed which is traveling data of the automobile and the like can be displayed.

In the HUD, there is a problem that the measured information displayed on the windshield is doubly observed.

In order to suppress double images, a wedge-shaped inter layer film has been used. The following Patent Document 1 discloses a sheet of laminated glass in which a wedge-shaped interlayer film having a prescribed wedge angle is sandwiched between a pair of glass plates. In such a sheet of laminated glass, by the adjustment of the wedge angle of the interlayer film, a display of measured information reflected by one glass plate and a display of measured information reflected by the other glass plate can be focused into one point to make an image in the visual field of a driver. As such, the display of measured information is hard to be observed doubly and the visibility of a driver is not hindered.

RELATED ART DOCUMENT

Patent Document

Patent Document 1; JP H4-502525 T

SUMMARY OF THE INVENTION

Problems to be Solved by the Invention

At the time of obtaining a sheet of laminated glass, a process in which an interlayer film is sandwiched between a pair of glass plates and subjected to degassing is performed. In a conventional wedge-shaped interlayer film, poor degassing is liable to occur. As a result, in the resulting sheet of laminated glass, an air bubble is left behind between a glass plate and the interlayer film. When an air bubble is left behind, a poor appearance of laminated glass is liable to occur. Moreover, in the HUD, the display of measured information becomes difficult to be observed. When the HUD has a constant wedge angle in an HUD area on which measured information is displayed, double images are liable to occur around the upper side part or the lower side part of the HUD area.

An object of the present invention is to provide an interlayer film for laminated glass with which an air bubble can be made difficult to be left behind between a lamination glass member and the interlayer film, and moreover, an interlayer film for laminated glass with which double images can be made less liable to occur within an HUD area, when laminated glass is obtained. Moreover, the present invention is also aimed at providing laminated glass prepared with the above-mentioned interlayer film for laminated glass.

Means for Solving the Problems

According to a broad aspect of the present invention, there is provided an interlayer film for laminated glass (in the present specification, sometimes abbreviated as "an interlayer film") containing a thermoplastic resin, having one end and the other end being at the opposite side of the one end and having a thickness thicker than the one end, having a region where the thickness is increased in a direction from the one end to the other end or having a region where the sectional shape in the thickness direction is a wedge-like shape, and having a portion where the amount of increase in the thickness is increased in a direction from the one end to the other end in the region where the thickness is increased, having a portion where the amount of increase in the thickness is decreased in a direction from the one end to the other end in the region where the thickness is increased, having a portion where the wedge angle is increased in a direction from the one end to the other end in the region where the sectional shape in the thickness direction is a wedge-like shape, or having a portion where the wedge angle is decreased in a direction from the one end to the other end in the region where the sectional shape in the thickness direction is a wedge-like shape, the ten-point average roughness Rz of the surface at a center position of the portion where the amount of increase in the thickness is increased, the portion where the amount of increase in the thickness is decreased, the portion where the wedge angle is increased, or the portion where the wedge angle is decreased being 20 μm or more.

In a specific aspect of the interlayer film according to the present invention, the interlayer film has a region where the thickness is increased in a direction from the one end to the other end and has a portion where the amount of increase in the thickness is increased in a direction from the one end to the other end in the region where the thickness is increased or has a portion where the amount of increase in the thickness is decreased in a direction from the one end to the other end in the region where the thickness is increased, and the ten-point average roughness Rz of the surface at a center position of the portion where the amount of Increase in the thickness is increased or the portion where the amount of increase in the thickness is decreased is 20 μm or more.

In a specific aspect of the interlayer film according to the present invention, the interlayer film has a region where the sectional shape in the thickness direction is a wedge-like shape and has a portion where the wedge angle is increased in a direction from the one end to the other end in the region where the sectional shape in the thickness direction is a wedge-like shape or has a portion where the wedge angle is decreased in a direction from the one end to the other end in the region where the sectional shape in the thickness direction is a wedge-like shape, and the ten-point average roughness Rz of the surface at a center position of the portion where the wedge angle is increased or the portion where the wedge angle is decreased is 20 μm or more.

In a specific aspect of the interlayer film according to the present invention, the thermoplastic resin is a polyvinyl acetal resin.

In a specific aspect of the interlayer film according to the present invention, the thickness at a position apart from the other end by 50 mm toward the one end is 1.2 times or more and 2.5 times or less of the thickness at a position apart from, the one end by 50 mm toward the other end.

In a specific aspect of the interlayer film according to the present invention, the interlayer film contains a plasticizer.

In a specific aspect of the interlayer film according to the present invention, the surface thereof is embossed.

According to a broad aspect of the present invention, there is provided laminated glass including a first lamination glass member, a second lamination glass member, and the above-described interlayer film for laminated glass, the interlayer film for laminated glass being arranged between the first lamination glass member and the second lamination glass member.

Effect of the Invention

Since the interlayer film for laminated glass according to the present invention contains a thermoplastic resin, has one end and the other end being at the opposite side of the one end and having a thickness thicker than the one end, has a region where the thickness is increased in a direction from the one end to the other end or has a region where the sectional shape in the thickness direction is a wedge-like shape, and has a portion where the amount of increase in the thickness is increased in a direction from the one end to the other end in the region where the thickness is increased, has a portion where the amount of increase in the thickness is decreased in a direction from the one end to the other end in the region where the thickness is increased, has a portion where the wedge angle is increased in a direction from the one end to the other end in the region where the sectional shape in the thickness direction is a wedge-like shape, or has a portion where the wedge angle is decreased in a direction from the one end to the other end in the region where the sectional shape in the thickness direction is a wedge-like shape, and the ten-point average roughness Rz of the surface at a center position of the portion where the amount of increase in the thickness is increased, the portion where the amount of increase in the thickness is decreased, the portion where the wedge angle is increased, or the portion where the wedge angle is decreased is 20 μm or more, an air bubble can be made difficult to be left behind between a lamination glass member and the interlayer film when laminated glass is obtained.

BRIEF DESCRIPTION OF DRAWINGS

FIG. 1 is a sectional view schematically showing an interlayer film for laminated glass in accordance with a first embodiment or the present invention.

FIG. 2 is a sectional view schematically showing an interlayer film for laminated glass in accordance with a second embodiment of the present invention.

FIG. 3 is a sectional view showing the first modified example of a sectional shape in the thickness direction of an interlayer film for laminated glass.

FIG. 4 is a sectional view showing the second modified example of a sectional shape in the thickness direction of an interlayer film for laminated glass.

FIG. 5 is a sectional view showing the third modified example of a sectional shape in the thickness direction of an interlayer film for laminated glass.

FIG. 6 is a sectional view showing the fourth modified example of a sectional shape in the thickness direction of an interlayer film for laminated glass.

FIG. 7 is a sectional view showing the fifth modified example of a sectional shape in the thickness direction of an interlayer film for laminated glass.

FIG. 8 is a sectional view showing the sixth modified example of a sectional shape in the thickness direction of an interlayer film for laminated glass.

FIG. 9 is a sectional view showing the seventh modified example of a sectional shape in the thickness direction of an interlayer film for laminated glass.

FIG. 10 is a sectional view showing the eighth modified example of a sectional shape in the thickness direction of an interlayer film for laminated glass.

FIG. 11 is a sectional view showing the ninth modified example of a sectional shape in the thickness direction of an interlayer film for laminated glass.

FIG. 12 is a sectional view showing the tenth modified example of a sectional shape in the thickness direction of an interlayer film for laminated glass.

FIG. 13 is a sectional view showing an example of laminated glass prepared with the interlayer film for laminated glass shown in FIG. 1.

FIG. 14 is a sectional view showing an example of the interlayer film for laminated glass not categorized as the interlayer film for laminated glass according to the present invention.

MODE(S) FOR CARRYING OUT THE INVENTION

Hereinafter, the details of the present invention will be described.

The interlayer film for laminated glass (in the present specification, sometimes abbreviated as "the interlayer film") according to the present invention has a one-layer structure or a two or more-layer structure. The interlayer film according to the present invention may have a one-layer structure and may have a two or more-layer structure. The interlayer film according to the present invention may have a two-layer structure and may have a three or more-layer structure. The interlayer film according to the present invention is provided with a first layer. The interlayer film according to the present invention may be a single-layered interlayer film provided with only the first layer and may be a multi-layered interlayer film provided with the first layer and another layer.

The interlayer film according to the present invention contains a thermoplastic resin. The interlayer film according to the present invention has one end and the other end being at the opposite side of the one end and having a thickness thicker than the one end. The one end and the other end are end parts of both sides facing each other in the interlayer film.

The interlayer film according to the present invention has a region where the thickness is increased in a direction from the one end to the other end {1) and 2)} or has a region where the sectional shape in the thickness direction is a wedge-like shape {3) and 4)}.

The interlayer film according to the present invention has a portion where the amount of increase in the thickness is increased in a direction from the one end to the other end in the region where the thickness is increased {1)}, has a portion where the amount of increase in the thickness is decreased in a direction from the one end to the other end in the region where the thickness is increased {2)}, has a portion where the wedge angle is increased in a direction from the one end to the other end in the region where the sectional shape in the thickness direction is a wedge-like shape {3)}, or has a portion where the wedge angle is decreased in a direction from the one end to the other end in the region where the sectional, shape in the thickness direction is a wedge-like shape {4)}.

In the interlayer film according to the present invention, the ten-point average roughness Rz of the surface at a center position of the portion where the amount of increase in the thickness is increased {1)}, the portion where the amount of increase in the thickness is decreased {2)}, the portion where the wedge angle is increased {3)}, or the portion where the wedge angle is decreased {4)} is 20 μm or more.

The surface at a center position of the portion where the amount of increase in the thickness is increased {1)}, the portion where the amount of increase in the thickness is decreased {2)}, the portion where the wedge angle is increased {3)}, or the portion where the wedge angle is decreased {4)} is measured for the ten-point average roughness Rz.

By virtue of the above-described configuration in the present invention, an air bubble can be made difficult to be left behind between a lamination glass member and the interlayer film when laminated glass is obtained. At the time of obtaining a sheet of laminated glass, a process in which an interlayer film is sandwiched between a first lamination glass member and a second lamination glass member and subjected to degassing is performed. Since the interlayer film according to the present invention is provided with the above-mentioned configuration, poor degassing is less liable to occur. As a result, in the resulting sheet or laminated glass, an air bubble is made difficult to be left behind between a glass plate and the interlayer film. Since an air bubble is hardly left behind, a poor appearance of laminated glass is less liable to occur. Moreover, in the HUD, the display of measured information becomes satisfactory.

In general, when an interlayer film has a uniform thickness, an air bobble is hardly left behind between a glass plate and the interlayer film. In contrast, it has been found out that, when the thickness of one end is thinner than the thickness of the other end, in other words, when a wedge-shaped interlayer film is adopted, poor degassing is liable to occur and an air bubble tends to be easily left behind. In particular, it has been found out that, in the portion where the amount of increase in the thickness is increased {1)}, the portion where the amount of increase in the thickness is decreased {2)}, the portion where the wedge angle is increased {3)}, or the portion where the wedge angle is decreased {4)}, an air bubble tends to be easily left behind. For example, it is thought that this is because, when an interlayer film is sandwiched between a first lamination glass member and a second lamination glass member or a surface treatment is performed with the use of an embossing roll and the like at the time of obtaining an interlayer film, contact properties between the interlayer film and the lamination glass member or contact properties between the interlayer film and the embossing roll vary with places.

The present inventors have found out that, even when the thickness of one end is thinner than the thickness of the other end, in other words, even when a wedge-shaped interlayer film is adopted, an air bubble can be made difficult to be left behind between a lamination glass member and the interlayer film by virtue of the above-mentioned configuration of the present invention.

Among measured values of the ten-point average roughness Rz of the surface at respective center positions of the portion where the amount of increase in the thickness is increased {1)}, the portion where the amount of increase in the thickness is decreased {2)}, the portion where the wedge angle is increased {3)}, and the portion where the wedge angle is decreased {4)}, measured values of the ten-point average roughness Rz of 1) and 2) may satisfy the above-mentioned requirement, measured values of the ten-point average roughness Rz of 3) and 4) may satisfy the above-mentioned requirement, measured values of the ten-point average roughness Rz of 1) and 3) may satisfy the above-mentioned requirement, measured values of the ten-point average roughness Rz of 2) and 4) may satisfy the above-mentioned requirement, a measured value of the ten-point average roughness Rz of 1) may satisfy the above-mentioned requirement, a measured value of the ten-point average roughness Rz of 2) may satisfy the above-mentioned requirement, a measured value of the ten-point average roughness Rz of 3) may satisfy the above-mentioned requirement, and a measured value of the ten-point average roughness Rz of 4) may satisfy the above-mentioned requirement.

In the portion where the amount of increase in the thickness is increased {1)} and the portion where the wedge angle is increased {3)}, the surface thereof is made to have a recess-like shape. In the portion where the amount of increase in the thickness is decreased {2)} and the portion where the wedge angle is decreased {4)}, the surface thereof is made to have a protrusion-like shape.

The ten-point average roughness Rz is measured in accordance with JIS B0601: 1994. The ten-point average roughness Rz is a value obtained by measuring a distance between two parallel lines of a straight line passing through the third from the highest point and a straight line passing through the third from the deepest point within a length to be sampled from the profile curve.

From the viewpoint of further making an air bubble difficult to be left behind, the ten-point average roughness Rz is preferably 25 μm or more, preferably 45 μm or less, more preferably 40 μm or less, and further preferably 35 μm or less. It has been found out that, when the ten-point average roughness Rz is 45 μm or less, an air bubble is further made difficult to be left behind as compared with the case of the ten-point average roughness Rz of more than 45 μm. Furthermore, it has been found out that, when the ten-point average roughness Rz is 40 μm or less, an air bubble is further made difficult to be left behind as compared with the case of the ten-point average roughness Rz of more than 40 μm.

It is preferred that at least one surface among surfaces of both sides of the interlayer film have a recess/protrusion shape. It is more preferred that surfaces of both sides of the interlayer film have a recess/protrusion shape. The method for forming the recess/protrusion shape is not particularly limited, and examples thereof include a lip emboss method, an embossing roll method, a calendar roll method, a profile extrusion method, and the like. Since it is possible to quantitatively form many embosses with a recess/protrusion shape constituting a constant uneven pattern, the embossing roll method is preferred.

Since effects of the present invention are further effectively attained, it is preferred that a surface of the interlayer film be embossed by an embossing roll method.

When an embossing roll method is applied thereto, by tilting at least one among two embossing rolls or the like to make an interval between the two embossing rolls at one end side of the interlayer film narrow and make an interval between the two embossing rolls at the other end side of the interlayer film wide, it becomes easy to control the ten-point average roughness Rz within a suitable range. Moreover, since the contact properties of an embossing roll are enhanced by adopting a relatively flexible material quality as the surface material quality of the embossing roll, it is easy to control the ten-point average roughness Rz of the surface at a center position of the portion where the amount of increase in the thickness is increased {1)}, the portion where the amount of increase in the thickness is decreased {2)}, the portion where the wedge angle is increased {3)}, or the portion where the wedge angle is decreased {4)} within a suitable range.

Examples of the relatively flexible material quality include a kind of rubber, a resin, a flexible alloy, and the like.

Hereinafter, specific embodiments of the present invention will be described with reference to the drawings.

FIG. 1 is a sectional view schematically showing an interlayer film for laminated glass in accordance with a first embodiment of the present invention. In this connection, for convenience of illustration, the size and dimensions of interlayer films in FIG. 1 and a figure described below are appropriately modified from the actual size and shape.

The interlayer film 11 is provided with a first layer 1 (intermediate layer), a second layer 2 (surface layer), and a third layer 3 (surface layer). The second layer 2 is arranged on a first surface side of the first layer 1 to be layered thereon. The third layer 3 is arranged on a second surface side opposite to the first surface of the first layer 1 to be layered thereon. The first layer 1 is arranged between the second layer 2 and the third layer 3 to be sandwiched therebetween. The interlayer film 11 is used for obtaining laminated glass. The interlayer film 11 is an interlayer film for laminated glass. The interlayer film 11 is a multilayer interlayer film.

The interlayer film 11 has one end 11a and the other end 11b at the opposite side of the one end 11a. The one end 1a and the other end 11b are end parts of both sides facing each other. The sectional shape in the thickness direction of each of the second layer 2 and the third layer 3 is a wedge-like shape. The sectional shape in the thickness direction of the first layer 1 is a rectangular shape. The thickness of the one end 11a side of each of the second layer 2 and the third layer 3 is thinner than that of the other end 11b side thereof. Accordingly, the thickness of the one end 11a of the interlayer film 11 is thinner than the thickness of the other end 11b thereof. Accordingly, the interlayer film 11 has a region being thin in thickness and a region being thick in thickness.

Moreover, the whole interlayer film 11 is constituted of a region where the thickness is increased. Furthermore, the interlayer film 11 has a region where the thickness is increased in a direction from the one end 11a to the other end 11b and has a portion where the amount of increase in the thickness is increased in a direction from the one end 11a to the other end 11b in the region where the thickness is increased. Specifically, in the interlayer film 11, the amount of increase in the thickness is increased in a direction from the one end 11a to the other end 11b. Moreover, the interlayer film 11 has a region where the sectional shape in the thickness direction is a wedge-like shape and has a portion where the wedge angle θ' is increased in a direction from the one end 11a to the other end 11b in the region where the sectional shape in the thickness direction is a wedge-like shape. Specifically, in the interlayer film 11, the wedge angle θ' is increased in a direction from the one end 11a to the other end 11b. For example, the wedge angle θ' can be calculated as a wedge angle in the case of assuming that the surface of an interlayer film portion extending between both ends apart from each other by a distance of 0.1X is a flat surface. In this connection, the wedge angle θ shown in FIG. 1 is a wedge angle formed by the whole region having a sectional shape in the thickness direction of the interlayer film 11 of a wedge-like shape.

FIG. 2 is a sectional view schematically showing an interlayer film for laminated glass in accordance with a second embodiment of the present invention. In FIG. 2, a section in the thickness direction of an interlayer film 11A is shown.

The interlayer film 11A shown in FIG. 2 is provided with a first layer 1A. The interlayer film 11A has a one-layer structure composed only of the first layer 1A and is a single-layered interlayer film. The interlayer film 11A is singly constituted by the first layer 1A. The interlayer film 11A is used for obtaining laminated glass. The interlayer film 11A is an interlayer film for laminated glass.

The sectional shape in the thickness direction of the first layer 1A corresponding to the interlayer film 11A is a wedge-like shape. The interlayer film 11A has one end 11a and the other end 11b at the opposite side of the one end 11a. The one end 11a and the other end lib are end parts of both sides facing each other. The thickness of the one end 11a of the interlayer film 11A is thinner than the thickness of the other end 11b thereof. Accordingly, the first layer 1A corresponding to the interlayer film 11A has a region being thin in thickness and a region being thick in thickness.

Moreover, the whole interlayer film 11A is constituted of a region where the thickness is increased. Furthermore, the interlayer film 11A has a region where the thickness is increased in a direction from the one end 11a to the other end 11b and has a portion where the amount of increase in the thickness is increased in a direction from the one end 11a to the other end 11b in the region where the thickness is increased. Moreover, the interlayer film 11A has a region where the sectional shape in the thickness direction is a wedge-like shape and has a portion where the wedge angle θ' is increased in a direction from the one end 11a to the other end 11b in the region where the sectional shape in the thickness direction is a wedge-like shape. In this connection, the wedge angle θ shown in FIG. 2 is a wedge angle formed by the whole region having a sectional shape in the thickness direction of the interlayer film 11A of a wedge-like shape.

The interlayer film 11 shown in FIG. 1 has a structure in which the rectangular-shaped first layer 1 is sandwiched between the wedge-shaped second layer 2 and the wedge-shaped third layer 3. In FIGS. 3 to 12, the first to tenth modified examples in which the interlayer film is changed in the shape of each layer or the whole shape are shown.

In this connection, interlayer films of the first to sixth, the eighth, the ninth, and the tenth modified examples (FIGS. 3 to 8, 10, 11, and 12) each have a region where the thickness is increased in a direction from the one end 11a to the other end 11b, have a portion where the amount of increase in the thickness is increased in a direction from the one end 11a to the other end 11b in the region where the thickness is increased, furthermore, have a region where the sectional shape in the thickness direction is a wedge-like shape, and have a portion where the wedge angle θ' is increased in a direction from the one end 11a to the other end 11b in the region where the sectional shape in the thickness direction is a wedge-like shape. Interlayer films of the seventh to tenth modified examples (FIGS. 9 to 12) each have a region where the thickness is increased in a direction from the one end 11a to the other end 11b, have a portion where the amount of increase in the thickness is decreased in a direction from the one end 11a to the other end 11b in the region where the thickness is increased, furthermore, have a region where the sectional shape in the thickness direction is a wedge-like shape, and have a portion where the wedge angle θ' is decreased in a direction from the one end 11a to the other end 11b in the region where the sectional shape in the thickness direction is a wedge-like shape.

An interlayer film 11B in accordance with the first modified example shown in FIG. 3 is provided with a first layer 1B having a sectional shape in the thickness direction of a wedge-like shape, a second layer 2B having a sectional shape in the thickness direction of a wedge-like shape, and a third layer 3B having a sectional, shape in the thickness direction of a wedge-like shape. The first layer 1B is arranged between the second layer 2B and the third layer 3B to be sandwiched therebetween.

The thickness of one end 11a side of each of the first layer 1B, the second layer 2B, and the third layer 3B is thinner than that of the other end 11b side thereof. Accordingly, the interlayer film 11B has a region being thin in thickness and a region being thick in thickness. In this connection, an interlayer film 11B may not have a third layer 3B.

By adopting the second layer 2B and the third layer 3B, the interlayer film 11B is made to have a portion where the amount of increase in the thickness is increased in a direction from the one end 11a to the other end 11b and have a portion where the wedge angle θ' is increased in a direction from the one end 11a to the other end 11b.

An interlayer film 11C in accordance with the second modified example shown in FIG. 4 is provided with a first layer 1C having a sectional shape in the thickness direction of a rectangular shape, a second layer 2C having a sectional shape in the thickness direction of a wedge-like shape, and a third layer 3C having a sectional shape in the thickness direction of a rectangular shape. The first layer 1C is arranged between the second, layer 2C and the third layer 3C to be sandwiched therebetween. The thickness of one end 11a side of the second layer 2C is thinner than that of the other end 11b side thereof. Accordingly, the interlayer film 11C has a region being thin in thickness and a region being thick in thickness. In this connection, an interlayer film 11C may not have a third layer 3C.

By adopting the second layer 2C, the interlayer film 11C is made to have a portion where the amount of increase in the thickness is increased in a direction from the one end 11a to the other end 11b and have a portion where the wedge angle θ' is increased in a direction from the one end 11a to the other end 11b.

An interlayer film 11D in accordance with the third modified example shown in FIG. 5 is provided with a first layer 1D having a sectional shape in the thickness direction of an outline shape formed by curving two long sides of a rectangle and arranging two short sides thereof in parallel with each other, a second layer 2D having a sectional shape in the thickness direction of a wedge-like shape, and a third layer 3D having a sectional shape in the thickness direction of an outline shape formed by curving two long sides of a rectangle and arranging two short sides thereof in parallel with each other. The whole second layer 2D has a uniform thickness. The whole third layer 3D has a uniform thickness. The first layer 1D is arranged between one second layer 2D and the third layer 3D to be sandwiched therebetween. The thickness of one end 11a side of the first layer 1D is thinner than that of the other end 11b side thereof. Accordingly, the interlayer film 11D has a region being thin in thickness and a region being thick in thickness. In this connection, an interlayer film 11D may not have a third layer 1D.

By adopting the first layer 1D, the interlayer film 11D is made to have a portion where the amount of increase in the thickness is increased in a direction from the one end 11a to the other end 11b and have a portion where the wedge angle θ' is increased in a direction from the one end 11a to the other end 11b.

An interlayer film 11E in accordance with the fourth modified example shown in FIG. 6 is provided with a first layer 1E having a sectional shape in the thickness direction of a rectangular shape and a second layer 2E having a sectional shape in the thickness direction of a wedge-like shape. The second layer 2E is arranged on a first surface side of the first layer 1E to be layered thereon. The thickness of one end 11a side of the second layer 2E is thinner than that of the other end 11b side thereof. Accordingly, the interlayer film 11E has a region being thin in thickness and a region being thick in thickness.

By adopting the second layer 2E, the interlayer film 11E is made to have a portion where the amount of increase in the thickness is increased in a direction from the one end 11a to the other end 11b and have a portion where the wedge angle θ' is increased in a direction from the one end 11a to the other end 11b.

An interlayer film 11F in accordance with the fifth modified example shown in FIG. 7 is provided with a first layer 1F having a sectional shape in the thickness direction of a rectangular shape and a second layer 2F having a portion 2Fa with a sectional shape in the thickness direction of a rectangular shape and a region 2Fb with a sectional shape in the thickness direction of a wedge-like shape. The second layer 2F is arranged on a first surface side of the first layer 1F to be layered thereon. The thickness of one end 11a side of the second layer 2F is thinner than that of the other end 11b side thereof. Accordingly, the interlayer film 11F has a region being thin in thickness and a region being thick in thickness.

By adopting the first layer 2F having the region 2Fb with a sectional shape in the thickness direction of a wedge-like shape, the interlayer film 11E is made to have a portion where the amount of increase in the thickness is increased in a direction from the one end 11a to the other end 11b and have a portion where the wedge angle θ' is increased in a direction from the one end 11a to the other end 11b.

An interlayer film 11G in accordance with the sixth modified example shown in FIG. 8 is provided with a first layer 1G having a sectional shape in the thickness direction of a rectangular shape and a second layer 2G having a portion 2Ga, with a sectional shape in the thickness direction of a wedge-like shape and a region 2Gb with a sectional shape in the thickness direction of a wedge-like shape. The second layer 2G is arranged on a first surface side of the first layer 1G to be layered thereon. The thickness of one end 11a side of the second layer 2G is thinner than that of the other end 11b side thereof. Accordingly, the interlayer film 11G has a region being thin in thickness and a region being thick in thickness.

In the portion 2Ga with a sectional shape in the thickness direction, of a wedge-like shape, the amount of increase in the thickness and the wedge angle θ' are constant in a direction from the one end 11a to the other end 11b. In the portion 2Ga with a sectional shape in the thickness direction of a wedge-like shape, the amount of increase in the thickness is not increased in a direction from the one end 11a to the other end 11b and the wedge angle θ' is not increased in a direction from the one end 11a to the other end 11b. In the portion 2Gb with a sectional shape in the thickness direction of a wedge-like shape, the amount of increase in the thickness is increased in a direction from the one end 11a to the other end 11b and the wedge angle θ' is increased in a direction from the one end 11a to the other end 11b.

By adopting the first layer 2G having the region 2Gb with a sectional shape in the thickness direction of a wedge-like shape, the interlayer film 11G is made to have a portion where the amount of increase in the thickness is increased in a direction from, the one end 11a to the other end 11b and have a portion where the wedge angle θ' is increased in a direction from the one end 11a to the other end 11b.

An interlayer film 11H in accordance with the seventh modified example shown in FIG. 9 is provided with a single-layered first layer 1H. The interlayer film 11H has a portion where the amount of increase in the thickness is decreased in a direction from the one end 11a to the other end 11b and has a portion where the wedge angle θ' is decreased in a direction from the one end 11a to the other end 11b.

An interlayer film 11I in accordance with the eighth modified example shown in FIG. 10 is provided with a single-layered first layer 1I. The interlayer film 11I is singly constituted by the first layer 1I having a sectional shape in the thickness direction of a rectangular shape.

The interlayer film 11I has a portion where the amount of increase in the thickness is increased in a direction, from the one end 11a to the other end 11b, has a portion where the amount of increase in the thickness is decreased in a direction from the one end 11a to the other end 11b, has a portion where the wedge angle θ' is increased in a direction from the one end 11a to the other end 11b, and has a portion where the wedge angle θ' is decreased in a direction from the one end 11a to the other end 11b.

An interlayer film 11J in accordance with the ninth modified example shown in FIG. 11 is provided with a first layer 1J having a sectional shape in the thickness direction of a rectangular shape, a second layer 2J having a sectional shape in the thickness direction of a wedge-like shape, and a third layer 3J having a sectional shape in the thickness direction of a wedge-like shape. The first layer 1J is arranged between the second layer 2J and the third layer 3J to be sandwiched therebetween.

The interlayer film 11J has a portion where the amount of increase in the thickness is increased in a direction from the one end 11a to the other end 11b, has a portion where the amount of increase in the thickness is decreased in a direction from the one end 11a to the other end 11b, has a portion where the wedge angle θ' is increased in a direction from the one end 11a to the other end 11b, and has a portion where the wedge angle θ' is decreased in a direction from the one end 11a to the other end 11b.

By adopting the second layer 2J and the third layer 3J, the interlayer film 11J is made to have a portion where the amount of increase in the thickness is increased in a direction from the one end 11a to the other end 11b and have a portion where the wedge angle θ' is increased in a direction from the one end 11a to the other end 11b.

By adopting the second layer 2J and the third layer 3J, the interlayer film 11J is made to have a portion where the amount of increase in the thickness is decreased in a direction from the one end 11a to the other end 11b and have a portion where the wedge angle θ' is decreased in a direction from the one end 11a to the other end 11b.

An interlayer film 11K in accordance with the tenth modified example shown in FIG. 12 is provided with a first layer 1K having a sectional shape in the thickness direction of a wedge-like shape, a second layer 2K having a section shape in the thickness direction of a wedge-like shape, and a third layer 3K having a sectional shape in the thickness direction of a wedge-like shape. The first layer 1K is arranged between the second layer 2K and the third layer 3K to be sandwiched therebetween.

The interlayer film 11 has a portion where the amount of increase in the thickness is increased in a direction from the one end 11a to the other end 11b, has a portion where the amount of increase in the thickness is decreased in a direction from the one end 11a to the other end 11b, has a portion where the wedge angle θ' is increased in a direction from the one end 11a to the other end 11b, and has a portion where the wedge angle θ' is decreased in a direction from the one end 11a to the other end 11b.

By adopting the second layer 2K and the third layer 3K, the interlayer film 11K is made to have a portion, where the amount of increase in the thickness is increased in a direction from the one end 11a to the other end 11b and have a portion where the wedge angle θ' is increased in a direction from the one end 11a to the other end 11b.

By adopting the second layer 2K and the third layer 3K, the interlayer film 11K is made to have a portion where the amount of increase in the thickness is decreased in a direction from the one end 11a to the other end 11b and have a portion where the wedge angle θ' is decreased in a direction from the one end 11a to the other end 11b.

In this connection, for reference, an interlayer film which is not categorized as the interlayer film according to the present invention is shown in FIG. 14.

In FIG. 14, a wedge-shaped interlayer film 101A is shown. In the wedge-shaped interlayer film 101A, the amount of increase in the thickness and the wedge angle θ' are constant in a direction from, one end 101a to the other end 101b. In the wedge-shaped interlayer film 101, the amount of increase in the thickness is not increased in a direction from the one end 101a to the other end 101b, the amount of increase in the thickness is not decreased in a direction from the one end 101a to the other end 101b, the wedge angle θ' is not increased in a direction from the one end 101a to the other end 101b, and the wedge angle θ' is not decreased in a direction from the one end 101a to the other end 101b.

In order to suppress double images, the wedge angle θ of the interlayer film can be appropriately set according to the fitting angle of laminated glass. From the viewpoint of further suppressing double images, the wedge angle θ of the interlayer film is preferably 0.01 mrad (0.0006 degrees) or more, more preferably 0.2 mrad (0.0115 degrees) or more, and preferably 2 mrad (0.1146 degrees) or less, and more preferably 0.7 mrad (0.0401 degrees) or less. The wedge angle θ of an interlayer film is an interior angle formed at the intersection point between a straight line connecting a point on the first surface of the maximum thickness part of the interlayer film and a point on the first surface of the minimum thickness part thereof and a straight line connecting a point on the second surface of the maximum thickness part of the interlayer film and a point on the second surface of the minimum thickness part thereof.

The interlayer film may have a colored band area in a partial region. The interlayer film may have a colored region in a partial region. When a multi-layered interlayer film has a colored band area or a colored region, it is preferred that a surface layer have a colored band area or a colored region. However, an intermediate layer may have a colored band area or a colored region. For example, at the time of extrusion-molding an interlayer film or at the time of extrusion-molding the respective layers of the interlayer film, a prescribed region can be blended with a coloring agent to form the colored band area or the colored region.

The thickness of the interlayer film is not particularly limited. The thickness of the interlayer film refers to the total thickness of the respective layers constituting the interlayer film. Thus, in the case of a multi-layered interlayer film 1, the thickness of the interlayer film refers to the total thickness of the first layer 1, the second layer 2, and the third layer 3.

The maximum thickness of the interlayer film is preferably 0.1 mm or more, more preferably 0.25 mm or more, further preferably 0.5 mm or more, especially preferably 0.8 mm or more, and preferably 3 mm or less, more preferably 2 mm or less, and further preferably 1.5 mm or less.

When the distance between one end and the other end is defined as X, it is preferred that the interlayer film have a minimum thickness in a region within a distance of 0X to 0.2X from the one end toward the inside and have a maximum thickness in a region within a distance of 0X to 0.2X from the other end toward the inside, and it is more preferred that the interlayer film have a minimum thickness in a region within a distance of 0X to 0.1X from the one end toward the inside and have a maximum thickness in a region within a distance of 0X to 0.1X from the other end toward the inside. It is preferred that one end of the interlayer film have a minimum thickness and the other end of the interlayer film have a maximum thickness. In the interlayer films 11, 11A, 11B, 11C, 11D, 11E, 11F, 11G, 11H, 11I, 11J, and 11K, the one end 11a has a minimum thickness and the other end 11b has a maximum thickness.

From the viewpoint of the practical aspect and the viewpoint of sufficiently heightening the adhesive force and the penetration resistance, the maximum thickness of a surface layer is preferably 0.001 mm or more, more preferably 0.2 mm or more, further preferably 0.3 mm or more, and preferably 1 mm or less, and more preferably 0.8 mm or less.

From the viewpoint of the practical aspect and the viewpoint of sufficiently enhancing the penetration resistance, the maximum thickness of a layer (intermediate layer) arranged between two surface layers is preferably 0.001 mm or more, more preferably 0.1 mm or more, further preferably 0.2 mm or more, and preferably 0.8 mm or less, more preferably 0.6 mm or less, and further preferably 0.3 mm or less.

The distance X between one end and the other end of the interlayer film is preferably 3 m or less, more preferably 2 m or less, especially preferably 1.5 m or less, and preferably 0.5 m or more, more preferably 0.8 m or more, and especially preferably 1 m or more.

Hereinafter, the details of materials constituting the respective layers of a multi-layered interlayer film and the single-layered interlayer film will be described.

(Thermoplastic Resin)

A thermoplastic resin contained in the interlayer film according to the present invention (the respective layers) is not particularly limited. As the thermoplastic resin, a conventionally known thermoplastic resin can be used. One kind of the thermoplastic resin may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

It is preferred that the thermoplastic resin be a polyvinyl acetal resin. By using a polyvinyl acetal resin and a plasticizer together, the adhesive force of the interlayer film for laminated glass according to the present invention to a lamination glass member or another interlayer film is further heightened.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more, and preferably 5000 or less, more preferably 4000 or less and further preferably 3500 or less. When the average polymerization degree is above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fail within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film, is sufficiently lowered.

The aldehyde is not particularly limited. In general, an aldehyde with 1 to 10 carbon atoms is suitably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Propionaldehyde, n-butyraldehyde, isobutyraldehyde, n-hexylaldehyde, or n-valeraldehyde is preferred, propionaldehyde, n-butyraldehyde, or isobutyraldehyde is more preferred, and n-butyraldehyde is further preferred. One kind of the aldehyde may be used alone and two or more kinds thereof may be used in combination.

The content of the hydroxyl group (the amount of hydroxy groups) of the polyvinyl acetal resin is preferably 15% by mole or more, more preferably 18% by mole or more, and preferably 40% by mole or less, and more preferably 35% by mole or less. When the content of the hydroxy group is the above lower limit or more, the adhesive force of the interlayer film is further heightened. Moreover, when the content of the hydroxyl group is the above upper limit or less, the flexibility of the interlayer film is enhanced and the handling of the interlayer film is facilitated.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

The acetylation degree (the amount of acetyl groups) of the polyvinyl acetal resin is preferably 0.1% by mole or more, more preferably 0.3% by mole or more, further preferably 0.5% by mole or more, and preferably 30% by mole or less, more preferably 25% by mole or less, and further preferably 20% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be measured in accordance with JIS K6728 "Testing methods for polyvinyl butyral".

The acetalization degree of the polyvinyl acetal resin (the butyralization degree in the case of a polyvinyl butyral resin) is preferably 60% by mole or more, more preferably 63% by mole or more, and preferably 85% by mole or less, more preferably 75% by mole or less, and further preferably 70% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree is a mole fraction, represented in percentage, obtained by dividing a value obtained by subtracting the amount of ethylene groups to which the hydroxy group is bonded and the amount of ethylene groups to which the acetyl group is bonded from the total amount of ethylene groups in the main chain by the total amount of ethylene groups in the main chain.

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

(Plasticizer)

From the viewpoint of further heightening the adhesive force of an interlayer film, it is preferred that the interlayer film according to the present invention (the respective layers) contain a plasticizer. When the thermoplastic resin contained in an interlayer film is a polyvinyl acetal resin, it is especially preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticiser include triethylene glycol di-2-ethylpropanoate, triethylene glycol di-2-ethylbutyrate, triethylene glycol di-2-ethylnexanoate, triethyiene glycol dicaprylate, triethyiene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butyiene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraetnylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

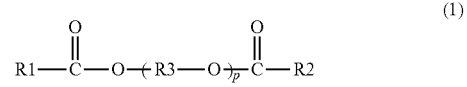

In the foregoing formula (1), R1 and R2 each represent an organic group with 5 to 10 carbon atoms, R3 represents an ethylene group, an isopropylene group, or an n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO) or triethylene glycol di-2-ethylbutyrate (3GH) and it is more preferred that the plasticizer include triethylene glycol di-2-ethylhexanoate.

The content of the plasticizer is not particularly limited. In the respective layers, the content of the plasticizer is preferably 25 parts by weight or more, more preferably 30 parts by weight or more, and preferably 60 parts by weight or less, and more preferably 50 parts by weight or less relative to 100 parts by weight of the thermoplastic resin. When the content of the plasticizer is the above lower limit or more, the penetration resistance of laminated glass is further enhanced. When the content of the plasticizer is the above upper limit or less, the transparency of the interlayer film is further enhanced.

(Heat Shielding Compound)

It is preferred that the interlayer film contain a heat shielding compound. It is preferred that the first layer contain a heat shielding compound. It is preferred that the second layer contain a heat shielding compound. It is preferred that the third layer contain a heat shielding compound. One kind of the heat shielding compound may be used alone and two or more kinds thereof may be used in combination.

It is preferred that the heat shielding compound be constituted of at least one kind of Ingredient X among a phthalocyanine compound, a naphthalocyanine compound, and an anthracyanine compound or be constituted of heat shielding particles. In this case, the heat shielding compound may be constituted of both of the Ingredient X and the heat shielding particles.

Ingredient X:

It is preferred that the interlayer film include at least one kind of Ingredient X among a phthalocyanine compound, a naphthalocyanine compound and an anthracyanine compound. It is preferred that the first layer contain the Ingredient X. It is preferred that the second layer contain the Ingredient X. It is preferred that the third layer contain the Ingredient X. The Ingredient X is a heat shielding compound. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthaliocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of a layer containing the Ingredient X (a first layer, a second layer or a third layer), the content of the Ingredient X is preferably 0.001% by weight or more, more preferably 0.005% by weight or more, farther preferably 0.01% by weight or more, especially preferably 0.02% by weight or more, and preferably 0.2% by weight or less, more preferably 0.1% by weight or less, further preferably 0.05% by weight or less and especially preferably 0.04% by weight or less. When the content of the Ingredient X is the above lower limit or more and the above upper limit or less, the heat shielding properties are sufficiently enhanced and the visible light transmittance is sufficiently heightened. For example, it is possible to make the visible light transmittance 70% or more.

Heat Shielding Particles:

It is preferred that the interlayer film include heat shielding particles. It is preferred that the first layer contain the heat shielding particles. It is preferred that the second layer contain the heat shielding particles. It is preferred that the third layer contain the heat shielding particles. The heat shielding particle is of a heat shielding compound. By the use of heat shielding particles, infrared rays (heat rays) can be effectively cut off. One kind of the heat shielding particles may be used alone, and two or more kinds thereof may be used in combination.

From the viewpoint of further heightening the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. As such, infrared rays are generally called heat rays. By the use of the beat shielding particles, infrared rays (heat rays) can be effectively cut off. In this connect ion, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped oxide particles (ITO particles), tin-doped zinc oxide particles and silicon-doped zinc oxide particles, lanthanum, hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, and preferably 0.1 μm or less and more preferably 0.05 μm or less. When the average particle diameter is the above lower limit or more, the heat ray shielding properties are sufficiently heightened. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of a layer containing the heat shielding particles (a first layer, a second layer, or a third layer), each content of the respective kinds of heat shielding particles (in particular, the content of tungsten oxide particles) is preferably 0.1% by weight or more, more preferably 0.1% by weight or more, further preferably 1% by weight or more, especially preferably 1.5% by weight or more, and preferably 6% by weight or less, more preferably 5.5% by weight or less, further preferably 4% by weight or less, especially preferably 3.5% by weight or less, and most preferably 3.0% by weight or less. When the content of the heat shielding particles is the above lower limit or more and the above upper limit or less, the heat shielding properties are sufficiently enhanced and the visible light transmittance is sufficiently heightened.

(Metal Salt)

It is preferred that the interlayer film contain at least one kind of metal salt (hereinafter, sometimes described as Metal salt M) among an alkali metal salt, an alkaline earth metal salt, and a magnesium salt. It is preferred that the first layer contain the Metal salt M. It is preferred that the second layer contain the Metal salt M. It is preferred that the third layer contain the Metal salt M. By the use of the Metal salt M, controlling the adhesivity between the interlayer film and a lamination glass member such as a glass plate or the adhesivity between respective layers in the interlayer film is facilitated. One kind of the Metal salt M may be used alone and two or more kinds thereof may be used in combination.

It is preferred that the Metal salt M contain at least one kind of metal selected from the group consisting of Li, Na, K, Rb, Cs, Mg, Ca, Sr, and Ba. It is preferred that the metal salt contained in the interlayer film contain at least one kind of metal between K and Mg.

Moreover, it is more preferred that the Metal salt M be an alkali metal salt of an organic acid with 2 to 16 carbon atoms, an alkaline earth metal salt of an organic acid with 2 to 16 carbon atoms, and a magnesium salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Although the magnesium carboxylate with 2 to 16 carbon atoms and the potassium carboxylate with 2 to 16 carbon acorns are not particularly limited, examples thereof include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in a layer containing the Metal salt M (a first layer, a second layer, or a third layer) is preferably 5 ppm or more, more preferably 10 ppm or more, further preferably 20 ppm or more, and preferably 300 ppm or less, more preferably 250 ppm or less, and further preferably 200 ppm or less. When the total of the contents of Mg and K is the above lower limit or more and the above upper limit or less, the adhesivity between the interlayer film and a glass plate or the adhesivity between respective layers in the interlayer film can be further well controlled.

(Ultraviolet Ray Screening Agent)

It is preferred that the interlayer film include an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent halting a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium, particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure or an ultraviolet ray screening agent having a benzoate structure, more preferably an ultraviolet ray screening agent having a benzotriazole structure or an ultraviolet ray screening agent having a benzophenone structure, and further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), and 2-(2'-hydroxy-3',5'-di-amylphenyl)benzotriazole ("Tinuvin 328" available from BASF Japan Ltd.). It is preferred that the ultraviolet ray screening agent be an ultraviolet ray screening agent having a benzotriazole structure containing a halogen atom and it is more preferred that the ultraviolet ray screening agent be an ultraviolet ray screening agent having a benzotriazole structure containing a chlorine atom, because those are excellent in ultraviolet ray absorbing performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K. K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K. K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

From the viewpoint of further suppressing the lowering in visible light transmittance after the lapse of a certain period of time, in 100% by weight of a layer containing the ultraviolet ray screening agent (a first layer, a second layer, or a third layer), the content of the ultraviolet ray screening agent, for example, the content of the benzotriazole compound, is preferably 0.1% by weight or more, more preferably 0.2% by weight or more, further preferably 0.3% by weight or more, especially preferably 0.5% by weight or more, and preferably 2.5% by weight or less, more preferably 2% by weight or less, further preferably 1% by weight or less, and especially preferably 0.8% by weight or less. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film include an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and too or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, tris(2,4-di-t-butyl-1-phenyl) phosphite, 2,2'-methylenebis(4,6-di-t-butyl-1-phenyloxy)(2-ethylhexyloxy)phosphorus, and the like. One kind or two or more kinds among these oxidation inhibitors are suitably used.

Examples of a commercial product of the oxidation inhibitor include "IRGANOX 245" available from EASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "IRGANOX 1010" available from BASF Japan Ltd., and the like.

With regard to the interlayer film and laminated glass, in order to maintain high visible light transmittance thereof over a long period of time, it is preferred that the content of the oxidation inhibitor be 0.1% by weight or more in 100% by weight of the interlayer film or in 100% by weight of the layer containing the oxidation inhibitor (a first layer, a second layer or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the first layer, the second layer, and the third layer may contain additives such as a coupling agent, a dispersing agent, a surfactant, a flame retardant, an antistatic agent, a pigment, a dye, an adhesive force regulating agent other than a metal salt, a moisture-resistance improving agent, a fluorescent brightening agent, and an infrared ray absorber, as necessary. One kind of these additives may be used alone and two or more kinds thereof may be used in combination.

(Laminated Glass)

FIG. 13 shows an example of laminated glass prepared with an interlayer film for laminated glass in accordance with one embodiment of the present invention represented as a sectional views.

The laminated glass 21 shown in FIG. 13 is provided with an interlayer film 11, a first lamination glass member 22, and a second lamination glass member 23. The interlayer film 11 is arranged between the first lamination glass member 22 and the second lamination glass member 23 to be sandwiched therebetween. The first lamination glass member 22 is arranged on a first, surface of the interlayer film 11. The second lamination glass member 23 is arranged on a second surface opposite to the first surface of the interlayer film 11.

Examples of the lamination glass member include a glass plate, a PET (polyethylene terephthalate) film, and the like. As the laminated glass, laminated glass in which an interlayer film is sandwiched between a glass plate and a PST film or the like, as well as laminated glass in which an interlayer film is sandwiched between two glass plates, is included. The laminated glass is a laminate provided with a glass plate and it is preferred that at least one glass plate be used. It is preferred that each of the first lamination glass member and the second lamination glass member be a glass plate or a PET (polyethylene terephthalate) film and the interlayer film include at least one glass plate as the first lamination glass member or the second lamination glass member. It is especially preferred that both of the first lamination glass member and the second lamination glass member be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, green glass, and the like. The organic glass is synthetic resin glass substituted for inorganic glass. Examples of the sheet of organic glass include a polycarbonate plate, a poly(meth)acrylic resin plate, and the like. Examples of the poly(meth)acrylic resin plate include a polymethyl (meth)acrylate plate, and the like.

Although respective thicknesses of the first, lamination glass member and the second lamination glass member are not particularly limited, the thickness is preferably 1 mm or more and preferably 5 mm or less. When the lamination glass member is a glass plate, the thickness of the glass plate is preferably 1 mm or more and preferably 5 mm or less. When the lamination glass member is a PET film, the thickness of the PET film is preferably 0.03 mm or more and preferably 0.5 mm or less.

The method for producing the laminated glass is not particularly limited. For example, the interlayer film is sandwiched between the first lamination glass member and the second lamination glass member, and then, passed through pressure rolls or subjected to decompression suction in a rubber bag. Therefore, the air remaining between the first lamination glass member and the interlayer film and between the second lamination glass member and the interlayer film is removed. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

The laminated glass can be used for automobiles, railway vehicles, aircraft, ships, buildings, and the like. It is preferred that the laminated glass be laminated glass for building or for vehicles and it is more preferred that the laminated glass be laminated glass for vehicles. The laminated glass can also be used for applications other than these applications. The laminated glass can be used for a windshield, side glass, rear glass, or roof glass of an automobile, and the like. Since the laminated glass is high in heat shielding properties and is high in visible light transmittance, the laminated glass is suitably used for automobiles.

Since laminated glass prepared with the interlayer film enables double images to be suppressed, the laminated glass can be suitably used for a windshield of an automobile. It is preferred that the interlayer film be used for laminated glass constituting a head-up display (HUD). It is preferred that the laminated glass constitute a head-up display (HUD).

In the laminated glass, measured information such as the speed which is sent from, a control unit and the like can be emitted from a display unit of the instrumental panel to be projected onto the windshield. As such, without making a driver of an automobile move his or her visual field downward, a front visual field and measured information can be visually observed simultaneously.

Hereinafter, the present invention will be described in more detail with reference to examples. The present invention is not limited only to these examples.

The following materials were used in examples and comparative examples.

Thermoplastic Resin:

Polyvinyl acetal resins were appropriately used. In all polyvinyl acetal resins used, n-butyraldehyde which has 4 carbon atoms is used for the acetalization.

With regard to the polyvinyl acetal resin, the acetalization degree (the butyralization degree), the acetylation degree, and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

Plasticizer:

3GO (triethylene glycol di-2-ethylhexanoate)

Ultraviolet Ray Screening Agent:

Tinuvin 326 (2-(2'-hydroxy-3'-t-butyl-5-methylphenyl)-5-chlorobenzotriazole, "Tinuvin 326" available from BASF Japan Ltd.)

Oxidation Inhibitor:

BHT (2,6-di-t-butyl-p-cresol)

Adhesive Force Regulating Agent:

A mixture of magnesium acetate and magnesium 2-ethylbutyrate (in a weight ratio of 1:1)

(Example 1)

Preparation of Resin Composition for Forming Interlayer Film:

To 100 parts by weight of a polyvinyl acetal resin (a PVB resin, the average polymerization degree of 1700, the amount of hydroxyl groups of 30.5% by mole, the acetalization degree of 68.5% by mole, the amount of acetyl groups of 1% by mole), 40 parts by weight of a plasticizer (3GO), 0.2 parts by weight of an ultraviolet ray screening agent (Tinuvin 326), 0.2 parts by weight of an oxidation inhibitor (BHT), and an adhesive force regulating agent (a mixture of magnesium acetate and magnesium 2-ethylbutyrate (in a weight ratio of 1:1)) in an amount that the content of Mg in the resulting interlayer film becomes 50 ppm were added and thoroughly kneaded with a mixing roll to obtain a resin composition for forming an interlayer film.

Preparation of Interlayer Film:

The resin composition obtained was extruded using an extruder to obtain an interlayer film before subjected to emboss processing which has a sectional shape in the thickness direction of a wedge-like shape. In this connection, when the width in the TD direction of the interlayer film was defined as X, X was determined to be 1333 mm.

One among two embossing rolls was tilted to make an interval between the two embossing rolls at one end side of an interlayer film narrow and to make an interval between the two embossing rolls at the other end side thereof wide, and by an embossing roll method, the surface of the obtained interlayer film before subjected to emboss processing was embossed to prepare an interlayer film (first layer). Moreover, an embossing roll in which the material quality of the roll surface is a metal was tilted to be used, and as a mating embossing roll to the tilted embossing roll, an embossing roll in which the material quality of the roll surface is a kind of rubber having a JIS hardness of 45 to 80 was used. In this connection, the interlayer film obtained was wound into a roll.

In the interlayer film obtained, the thickness of one end in the TD direction was made thinner than the thickness of the other end at the opposite side of the one end, the thickness in the MD direction was made uniform, end the maximum thickness of the first layer and the second layer, the minimum thickness thereof, and the wedge angle θ of the interlayer film were set to those listed in the following Table 1. The outline of a section in the thickness direction of the interlayer film obtained was determined to have a shape shown in FIG. 10. The sectional shape in the thickness direction of the interlayer film obtained was determined to be a wedge-like shape and the interlayer film was determined to have a shape in which the thickness is gradually thickened from, one end toward the other end. The interlayer film was determined to have a minimum thickness at one end and have a maximum thickness at the other end. The interlayer film was determined to have a portion where the amount of increase in the thickness is increased in a direction from the one end to the other end and have a portion (recess-shaped portion) where the wedge angle θ' is increased in a direction from the one end to the other end. The interlayer film, was determined to have a portion where the amount of increase in the thickness is decreased in a direction from the one end to the other end and have a portion (protrusion-shaped portion) where the wedge angle θ' is decreased in a direction from the one end to the other end. When the width in the TD direction of the interlayer film was defined as X, the interlayer film was determined to have a portion (recess-shaped portion), including a position apart from the one end by 0.25X, to wedge angle is increased in a direction from the one end to the other end and have a portion (protrusion-shaped portion), including a position apart from one end by 0.5X, where the wedge angle is decreased in a direction from the one end to the other end.

Preparation of Laminated Glass:

The interlayer film obtained was cut into a size of (1333 mm in TD direction×600 mm in MD direction) so that respective middle portions in the longitudinal direction and the transversal direction are included. Next, the interlayer film was sandwiched between two sheets of clear glass (1333 mm in longitudinal length×600 mm in transversal length×2.5 mm in thickness) to obtain a laminate. The laminate was put into a rubber bag and the inside thereof was degassed for 20 minutes at a degree of vacuum of 2.6 kPa, after which the laminate was transferred into an oven while keeping the laminate degassed, and furthermore, held in place at 90° C. for 30 minutes and pressed under vacuum to subject the laminate to preliminary press-bonding. The preliminarily press-bonded laminate was subjected to press-bonding for 20 minutes under conditions of 135° C. and a pressure of 1.2 MPa in an autoclave to obtain a sheet of laminated glass.

(Example 2)

Preparation of Resin Composition for Forming First Layer:

With 100 parts by weight of a polyvinyl acetal resin (a PVB resin, the average polymerization degree of 3000, the amount of hydroxyl groups of 22% by mole, the acetalization degree of 65% by mole, the amount of acetyl groups of 13% by mole), 60 parts by weight of a plasticizer (3GO), 0.2 parts by weight of an ultraviolet ray screening agent (Tinuvin 326), and 0.2 parts by weight of an oxidation inhibitor (BHT) were mixed to obtain a resin composition for forming a first layer.

Preparation of Resin Composition for Forming Second Layer and Third Layer:

With 100 parts by weight of a polyvinyl acetal resin (a PVB resin, the average polymerization degree of 1700, the amount of hydroxyl groups of 30.6% by mole, the acetalization degree of 68.5% by mole, the amount of acetyl groups of 0.9% by mole), 40 parts by weight of a plasticizer (3GO), 0.2 parts by weight of an ultraviolet ray screening agent (Tinuvin 326), 0.2 parts by weight of an oxidation inhibitor (BHT), and an adhesive force regulating agent (a mixture of magnesium acetate and magnesium 2-ethylbutyrate (in a weight ratio of 1:1)) in an amount that the content of Mg in the resulting interlayer film becomes 50 ppm were mixed to obtain a resin composition for forming a second layer and a third layer.

Preparation of Interlayer Film:

The resin composition for forming a first layer and the resin composition for forming a second layer and a third layer were coextruded using a coextruder to obtain an interlayer film before subjected to emboss processing which has a layered structure with a stack of a second layer (600 μm in average thickness)/a first layer (150 μm in average thickness)/a third layer (450 μm in average thickness) and has a sectional shape in the thickness direction of a wedge-like shape. In this connection, when the width in the TD direction of the interlayer film was defined as X, X was determined to be 1270 mm.

One among two embossing rolls was tilted to make an interval between the two embossing rolls at one end side of an interlayer film narrow and to make an interval between the two embossing rolls at the other end side thereof wide, and by an embossing roll method, the surface of the obtained interlayer film before subjected to emboss processing was embossed to prepare an interlayer film (second layer/first layer/third layer). Moreover, an embossing roll in which the material quality of the roll surface is a metal was tilted to be used, and as a mating embossing roll to the tilted embossing roll, an embossing roll in which the material quality of the roll surface is a kind of rubber having a JIS hardness of 45 to 80 was used. In this connection, the interlayer film obtained was wound into a roll.

The second layer was determined to have a thickness of one end in the TD direction thinner than the thickness of the other end at the opposite side of the one end, a uniform thickness in the MD direction, a thickness of the one end of 325 μm, a thickness of the other end of 1875 μm, a sectional shape in the thickness direction of a wedge-like shape, and a shape in which the thickness is gradually thickened from the one end toward the other end. The first layer was determined to hare a thickness of one end in the TD direction equal to the thickness of the other end at the opposite side of the one end, a uniform thickness in the MD direction, a thickness of 150 μm, and a sectional shape in the thickness direction of a rectangular shape. The third layer was determined to have a thickness of one end in the TD direction thinner than the thickness of the other end at the opposite side of the one end, a uniform thickness in the MD direction, a thickness of the one end of 325 μm, a thickness of the other end of 575 μm, a sectional shape in the thickness direction of a wedge-like shape, and a shape in which the thickness is gradually thickened from the one end toward the other end. The second and third layers each were determined to have a portion where the amount of increase in the thickness is decreased in a direction from the one end to the other end and have a portion (protrusion-shaped portion) where the wedge angle θ' is decreased in a direction from the one end to the other end. When the width in the TD direction of the interlayer film was defined as X, the second and third layers each were determined to have a portion (recess-shaped portion), including a position apart from one end by 0.25X, where the wedge angle is increased in a direction from the one end to the other end and have a portion (protrusion-shaped portion), including a position apart from one end by 0.5X, where the wedge angle is decreased in a direction from the one end to the other end.

In the interlayer film obtained, the thickness of one end in the TD direction was made thinner than the thickness of the other end at the opposite side of the one end, the thickness in the MD direction was made uniform, and the maximum thickness of the first layer and the second layer, the minimum thickness thereof, and the wedge angle θ of the interlayer film were set to those listed in the following Table 1. The outline of a section in the thickness direction of the interlayer film obtained was determined to have a shape shown in FIG. 11. The sectional shape in the thickness direction of the interlayer film obtained was determined to be a wedge-like shape and the interlayer film was determined to have a shape in which the thickness is gradually thickened from one end toward the other end. The interlayer film was determined to have a minimum thickness at one end and have a maximum thickness at the other end. The interlayer film, was determined to have a portion (recess-shaped portion) where the amount of increase in the thickness is increased in a direction from the one end to the other end and have a portion, where the wedge angle θ' is increased in a direction from the one end to the other end. The interlayer film was determined to have a portion where the amount of increase in the thickness is decreased in a direction from the one end to the other end and have a portion (protrusion-shaped portion) where the wedge angle θ' is decreased in a direction from the one end to the other end. When the width in the TD direction of the interlayer film was defined as X, the interlayer film was determined to have a portion (recess-shaped portion), including a position apart from one end by 0.25X, where the wedge angle is increased in a direction from the one end to the other end and have a portion (protrusion-shaped portion), including a position apart from one end by 0.5X, where the wedge angle is decreased in a direction from the one end to the other end.

Preparation of Laminated Glass:

The interlayer film obtained was cut into a size of (1270 mm in TD direction×600 mm in MD direction) so that respective middle portions in the longitudinal direction and the transversal direction are included. Next, the interlayer film was sandwiched between two sheets of clear glass (1270 mm in longitudinal length×600 mm in transversal length×2.5 mm in thickness) to obtain a laminate. The laminate was put into a rubber bag and the inside thereof was degassed for 20 minutes at a degree of vacuum of 2.6 kPa, after which the laminate was transferred into an oven while being degassed, and furthermore, held in place for 30 minutes at 90° C. and pressed under vacuum to subject the laminate to preliminary press-bonding. The preliminarily press-bonded laminate was subjected to press-bonding for 20 minutes under conditions of 135° C. and a pressure of 1.2 MPa in an autoclave to obtain a sheet of laminated glass.

(Example 3)

In Example 3, as in the case of Example 1, one among two embossing rolls was tilted to make an interval between the two embossing rolls at one end side of an interlayer film narrow and to make an interval between the two embossing rolls at the other end side thereof wide when the surface of the obtained interlayer film before subjected to emboss processing was embossed. An interlayer film was obtained in the same manner as that in Example 1 except that, as a mating embossing roll to the tilted embossing roll, an embossing roll in which the material quality of the roll surface is a flexible alloy was used. A sheet of laminated glass was obtained in the same manner as that in Example 1 except that the interlayer film obtained was used.

(Example 4)

In Example 4, as in the case of Example 2, one among two embossing rolls was tilted to make an interval between the two embossing rolls at one end side of an interlayer film narrow and to make an interval between the two embossing rolls at the other end side thereof wide when the surface of the obtained interlayer film before subjected to emboss processing was embossed. An interlayer film was obtained in the same manner as that in Example 2 except that, as a mating embossing roll to the tilted embossing roll, an embossing roll in which the material quality of the roll surface is a flexible alloy was used. A sheet of laminated glass was obtained in the same manner as that in Example 2 except that the interlayer film obtained was used.

(Examples 5, 6)

In Examples 5 and 6, as in the case of Example 2, one among two embossing rolls was tilted to make an interval between the two embossing rolls at one end side of an interlayer film narrow and to make an interval between the two embossing rolls at the other end side thereof wide when the surface of the obtained interlayer film before subjected to emboss processing was embossed. An interlayer film was obtained in the same manner as that in Example 2 except that the tilt angle of the embossing roll and the pressing force of the embossing roll were changed. A sheet of laminated glass was obtained in the same manner as that in Example 2 except that the interlayer film obtained was used.

(Example 7)

Preparation of Interlayer Film:

Resin compositions similar to those in Example 2 were extruded using an extruder, in which the kind of the die was changed, to obtain an interlayer film before subjected to emboss processing which has a layered structure with a stack of a second layer (500 μm in average thickness)/a first layer (200 μm in average thickness)/a third layer (500 μm in average thickness) and has a sectional shape in the thickness direction of a wedge-like shape.

One among two embossing rolls was tilted to make an interval between the two embossing rolls at one end side of an interlayer film narrow and to make an interval between the two embossing rolls at the other end side thereof wide, and by an embossing roll method, the surface of the obtained interlayer film before subjected to emboss processing was embossed to prepare an interlayer film (second layer/first layer/third layer). In this connection, the interlayer film obtained was wound into a roll.

The second layer was determined to have a thickness of one end in the TD direction thinner than the thickness of the other end at the opposite side of the one end, a uniform thickness in the MD direction, a thickness of the one end of 325 μm, a thickness of the other end of 675 μm, a sectional shape in the thickness direction of a wedge-like shape, and a shape in which the thickness is gradually thickened from the one end toward the other end. The first layer was determined to have a thickness of one other end at TD direction thinner than the thickness of the other end at the opposite side of the one end, a uniform thickness in the MD direction, a thickness of the one end of 150 μm, a thickness of the other end of 250 μm, a sectional shape in the thickness direction of a wedge-like shape, and a shape in which the thickness is gradually thickened from the one end toward the other end. The third layer was determined to have a thickness of one end in the TD direction thinner than the thickness of the other end at the opposite side of the one end, a uniform thickness in the MD direction, a thickness of the one end of 325 μm, a thickness of the other end of 675 μm, a sectional shape in the thickness direction of a wedge-like shape, and a shape in which the thickness is gradually thickened from the one end toward the other end. The second and third layers each were determined to have a portion where the amount of increase in the thickness is decreased in a direction from, the one end to the other end and have a portion (protrusion-shaped portion) where the wedge angle θ' is decreased in a direction from the one end to the other end. When the width in the TD direction of the interlayer film was defined as X, the second and third layers each were determined to have a portion (recess-shaped portion), including a position apart from, one end by 0.25X, where the wedge angle is increased in a direction from the one end to the other end and have a portion (protrusion-shaped portion), including a position apart from one end by 0.5X, where the wedge angle is decreased in a direction, from the one end to the other end.

In the interlayer film, obtained, the thickness of one end in the TD direction was made thinner than the thickness of the other end at the opposite side of the one end, the thickness in the MD direction was made uniform, and the maximum thickness of the first layer and the second layer, the minimum thickness thereof, and the wedge angle θ of the interlayer film were set to those listed, in the following Table 1. The outline of a section in the thickness direction of the interlayer film obtained was determined to have a shape shown in FIG. 12. The sectional shape in the thickness direction of the interlayer film obtained was determined to be a wedge-like shape and the interlayer film was determined to have a shape in which the thickness is gradually thickened from one end toward the other end. The interlayer film was determined to have a minimum thickness at one end and have a maximum thickness at the other end. The interlayer film was determined to have a portion (recess-shaped portion) where the amount of increase in the thickness is increased in a direction from the one end to the other end and have a portion where the wedge angle θ' is increased in a direction from the one end to the other end. The interlayer film, was determined to have a portion where the amount of increase in the thickness is decreased in a direction from the one end to the other end and have a portion (protrusion-shaped, portion) where the wedge angle θ' is decreased in a direction from the one end to the other end. When the width in the TD direction of the interlayer film was defined as X, the interlayer film was determined to have a portion. (recess-shaped portion), including a position, apart from one end by 0.25X, where the wedge angle is increased in a direction from the one end to the other end and have a portion (protrusion-shaped portion), including a position apart from one end by 0.5X, where the wedge angle is decreased in a direction from the one end to the other end.

Preparation of Laminated Glass:

A sheet of laminated glass was obtained in the same manner as that in Example 1 except that the interlayer film obtained was used.

(Comparative Example 1)

In Comparative Example 1, one among two embossing rolls was tilted to make an interval between the two embossing rolls at one end side of an interlayer film narrow and to make an interval between the two embossing rolls at the other end side thereof wide when the surface of the interlayer film before subjected to emboss processing obtained in Example 2 was embossed. An interlayer film was obtained in the same manner as that in Example 2 except that the tilt angle of the tilted embossing roll was made larger than that in Example 2 and the pressing force of the embossing roll was changed. A sheet of laminated glass was obtained in the same manner as that in Example 2 except that the interlayer film obtained was used.

(Comparative Example 2)

In Comparative Example 2, one among two embossing rolls was tilted to make an interval between the two embossing rolls at one end side of an interlayer film narrow and to make an interval, between the two embossing rolls at the other end side thereof wide when the surface of the interlayer film before subjected to emboss processing obtained in Example 1 was embossed. An interlayer film was obtained in the same manner as that in Example 1 except that the tilt angle of the tilted embossing roll was made smaller than that in Example 1 and the pressing force of the embossing roll was changed. A sheet of laminated glass was obtained in the same manner as that in Example 1 except that the interlayer film obtained was used.

(Comparative Example 3)

In Comparative Example 3, one among two embossing rolls was tilted to make an interval between the two embossing rolls at one end side of an interlayer film narrow and to make an interval between the two embossing rolls at the other end side thereof wide when the surface of the interlayer film before subjected to emboss processing obtained in Example 1 was embossed. An interlayer film was obtained in the same manner as that in Example 1 except that, as the tilted embossing roll, an embossing roll in which the material quality of the roll, surface is a metal was used. A sheet of laminated glass was obtained in the same manner as that in Example 1 except that the interlayer film obtained was used.

(Comparative Example 4)

In Comparative Example 4, one among two embossing rolls was tilted to make an interval between the two embossing rolls at one end side of an interlayer film narrow and to make an interval between the two embossing rolls at the other end side thereof wide when the surface of the interlayer film before subjected to emboss processing obtained in Example 2 was embossed. An interlayer film was obtained in the same manner as that in Example 2 except that, as the tilted embossing roll, an embossing roll in which the material quality of the roll surface is a metal was used. A sheet of laminated glass was obtained in the same manner as that in Example 2 except that the interlayer film obtained was used.

(Evaluation)

(1) Ten-Point Average Roughness Rz

By a method in which JIS B 0601 (1994), the interlayer film obtained was measured at a center position of the portion where the amount of increase in the thickness is increased in a direction from the one end to the other end (the portion where the wedge angle θ' is increased in a direction from the one end to the other end) for the ten-point average roughness Rz. Furthermore, the interlayer film obtained was measured at a center position of the portion where the amount of increase in the thickness is decreased in a direction from the one end to the other end (the portion where the wedge angle θ' is decreased in a direction from the one end to the other end) for the ten-point average roughness Rz. Measurement conditions were set to conditions of Cut-off value=2.5 mm, Sampling length=2.5 mm, Evaluation length=12.5 mm, Radius at the tip of the probe=2 μm, Angle at the tip thereof=60°, and Measurement speed=0.5 mm/s and the measurement was performed under the environment of 23° C. and 30 RH %.

(2) Existence or Non-Existence of Air Bubble Left Behind in Laminated Glass

The sheet of laminated glass obtained was evaluated whether or not an air bubble was left behind. The existence or non-existence of an air bubble left behind was judged according to the following criteria.

[Criteria for Judgment in Existence or Non-Existence of Air Bubble Left Behind]

◯: No air bubble is left behind.

Δ: An air bubble is left behind but the largest diameter of the air bubble is less than 50 μm.

x: An air bubble is left behind and the largest diameter of the air bubble is 50 μm or more.

(2A) Existence or Non-Existence of Air Bubble Left Behind in Laminated Glass After Allowed to Stand at 130° C. for 2 Hours After the evaluation for the above-mentioned (2) Existence or non-existence of air bubble left behind in laminated glass, the sheet of laminated glass obtained was allowed to stand for 2 hours under a temperature condition of 130° C. which permits air bubbles to easily grow. After allowed to stand at 130° C. for 2 hours, the sheet was evaluated whether or not an air bubble was left behind. The existence or non-existence of an air bubble left behind was judged according to the following criteria.

[Criteria for Judgment in Existence or Non-Existence of Air Bubble Left Behind]

◯: No air bubble is left behind.

Δ1: An air bubble is slightly left behind but the largest diameter of the air bubble is less than 25 μm.

Δ2: An air bubble is left behind but the largest diameter of the air bubble is 25 μm or more and less than 50 μm.

x: An air bubble is left behind and: the largest diameter of the air bubble is 50 μm or more.

(3) Double Images

A sheet of laminated glass was installed at a position of the windshield. The information to be displayed, which is emitted, from a display unit installed below the sheet of laminated glass, was reflected in the sheet of laminated glass to visually confirm the presence or absence of double images at a prescribed position. The double images were judged according to the following criteria.

[Criteria for Judgment in Double Images]

◯: Double images are not confirmed.

x: Double images are confirmed.

The results are shown in the following Table 1.

TABLE 1

| | Constitution of interlayer film | | | | Evaluation | | | | |
|---|---|---|---|---|---|---|---|---|---|
| | | | | | (1) Ten-point average roughness Rz | | | (2A) Existence | |
| | Wedge angle ° | Maximum thickness μm | Minimum thickness μm | Sectional shape in thickness direction | Portion where amount of increase is increased (Recess-shaped portion) μm | Portion where amount of increase is decreased (Protrusion-shaped portion) μm | (2) Existence or non-existence of air bubble left behind | or non-existence of air bubble left behind after allowed to stand at 130° C. for 2 hours | (3) Double images |
| Example 1 | 0.30 | 1200 | 800 | FIG. 10 | 28 | 45 | ◯ | Δ1 | ◯ |
| Example 2 | 0.63 | 1600 | 800 | FIG. 11 | 36 | 44 | ◯ | Δ1 | ◯ |
| Example 3 | 0.3 | 1200 | 800 | FIG. 10 | 29 | 36 | ◯ | ◯ | ◯ |
| Example 4 | 0.63 | 1600 | 800 | FIG. 11 | 35 | 39 | ◯ | ◯ | ◯ |
| Example 5 | 0.63 | 1600 | 800 | FIG. 11 | 50 | 54 | Δ | Δ2 | ◯ |
| Example 6 | 0.63 | 1600 | 800 | FIG. 11 | 22 | 26 | ◯ | ◯ | ◯ |
| Example 7 | 0.63 | 1600 | 800 | FIG. 12 | 30 | 35 | ◯ | ◯ | ◯ |
| Comparative Example 1 | 0.63 | 1600 | 800 | FIG. 11 | 12 | 35 | x | x | ◯ |
| Comparative Example 2 | 0.3 | 1200 | 800 | FIG. 10 | 18 | 35 | x | x | ◯ |
| Comparative Example 3 | 0.3 | 1200 | 800 | FIG. 10 | 13 | 32 | x | x | ◯ |
| Comparative Example 4 | 0.63 | 1600 | 800 | FIG. 11 | 14 | 43 | x | x | ◯ |

EXPLANATION OF SYMBOLS 1, 1A, 1B, 1C, 1D, 1E, 1F, 1G, 1H, 1I, 1J, 1K: First layer
2, 2B, 2C, 2D, 2E, 2F, 2G, 2J, 2K: Second layer
2Fa; Portion having sectional shape in thickness direction of rectangular shape
2Fb: Region having sectional shape in thickness direction of wedge-like shape
2Ga: Portion having sectional shape in thickness direction of wedge-like shape
2Gb: Region having sectional shape in thickness direction of wedge-like shape
3, 3B, 3C, 3D, 3J, 3K: Third layer
11, 11A, 11B, 11C, 11D, 11E, 11F, 11G, 11H, 11I, 11J, 11K: Interlayer film
11a: One end
11b: The other end
21: Laminated glass
22: Lamination glass member
23: Lamination glass member

The invention claimed is:

1. An interlayer film for laminated glass, comprising:
a first layer containing a combination of polyvinyl acetal resin and plasticizer; and
a second layer containing a combination of polyvinyl acetal resin and plasticizer,
the second layer being arranged on a first surface side of the first layer,
the combination of polyvinyl acetal resin and plasticizer contained in the first layer being a combination of polyvinyl butyral resin and triethylene glycol di-2-ethylhexanoate,
the combination of polyvinyl acetal resin and plasticizer contained in the second layer being a combination of polyvinyl butyral resin and triethylene glycol di-2-ethylhexanoate,
the polyvinyl butyral resin in the first layer being obtained by acetalizing polyvinyl alcohol with only one aldehyde, the aldehyde consisting of n-butyraldehyde,
a content of the triethylene glycol di-2-ethylhexanoate in the first layer being 60 parts by weight or more relative to 100 parts by weight of the polyvinyl butyral resin in the first layer,
a content of the triethylene glycol di-2-ethylhexanoate in the second layer being 30 parts by weight or more relative to 100 parts by weight of the polyvinyl butyral resin in the second layer,
the interlayer film having one end and the other end being at the opposite side of the one end and having a thickness thicker than the one end,
the interlayer film having a region where the thickness is increased in a direction from the one end to the other end, and
the interlayer film having a portion where the amount of increase in the thickness is increased in a direction from the one end to the other end in the region where the thickness is increased, or having a portion where the amount of increase in the thickness is decreased in a direction from the one end to the other end in the region where the thickness is increased,
a ten-point average roughness Rz of a surface of the interlayer film at a center position of the portion where the amount of increase in the thickness is increased, or the portion where the amount of increase in the thickness is decreased being 20 µm or more, and the maximum thickness of the interlayer film being 0.87 mm or more.

2. The interlayer film for laminated glass according to claim 1, wherein the thickness at a position apart from the other end by 50 mm toward the one end is 1.2 times or more and 2.5 times or less of the thickness at a position apart from the one end by 50 mm toward the other end.

3. The interlayer film for laminated glass according to claim 1, wherein a surface of the interlayer film is embossed.

4. A laminated glass, comprising:
a first lamination glass member;
a second lamination glass member; and
the interlayer film for laminated glass according to claim 1,
the interlayer film for laminated glass being arranged between the first lamination glass member and the second lamination glass member.

5. The interlayer film for laminated glass according to claim 1, wherein a wedge angle of the interlayer film is 0.01 mrad or more.

6. The interlayer film for laminated glass according to claim 1, wherein the maximum thickness of the interlayer film is 1.2 mm or more.

7. The interlayer film for laminated glass according to claim 1, wherein the ten-point average roughness Rz of the surface at a center position of the portion where the amount of increase in the thickness is increased, or the portion where the amount of increase in the thickness is decreased is 20 µm or more and 35 µm or less.

8. The interlayer film for laminated glass according to claim 1, wherein the ten-point average roughness Rz of the surface at a center position of the portion where the amount of increase in the thickness is increased, or the portion where the amount of increase in the thickness is decreased is 20 µm or more and 30 µm or less.

9. The interlayer film for laminated glass according to claim 1, wherein the ten-point average roughness Rz of the surface of the interlayer film at a center position of the portion where the amount of increase in the thickness is increased, or the portion where the amount of increase in the thickness is decreased is 44 µm or more.

10. The interlayer film for laminated glass according to claim 1, further comprising a phosphorus-based oxidation inhibitor at a content of less than 2% by weight in 100% by weight of the interlayer film.

11. The interlayer film for laminated glass according to claim 1, further comprising an Ingredient X selected from the group consisting of phthalocyanine, a derivative of phthalocyanine, naphthalocyanine and a derivative of naphthalocyanine, at a content of 0.001% by weight or more and 0.2% by weight or less in 100% by weight of the interlayer film.

12. The interlayer film for laminated glass according to claim 1, further comprising:
a third layer containing a combination of polyvinyl acetal resin and plasticizer,
wherein the third layer is arranged on a second surface side opposite to the first surface of the first layer, and
the combination of polyvinyl acetal resin and plasticizer contained in the third layer is a combination of polyvinyl butyral resin and triethylene glycol di-2-ethylhexanoate.

13. The interlayer film for laminated glass according to claim 1, further comprising an ultraviolet ray screening agent, the ultraviolet ray screening agent comprising at least one selected from the group consisting of platinum particles, particles in which the surface of platinum particles is coated with silica, palladium particles, and particles in which the surface of palladium particles is coated with silica.

14. The interlayer film for laminated glass according to claim 13, further comprising heat shielding particles, the heat shielding particles comprising at least one selected from the group consisting of gallium-doped zinc oxide particles, niobium-doped titanium oxide particles, thallium-doped tungsten oxide particles, and rubidium-doped tungsten oxide particles.

* * * * *